US011814193B2

(12) United States Patent
Springer

(10) Patent No.: US 11,814,193 B2
(45) Date of Patent: *Nov. 14, 2023

(54) MODULAR STAIRCASE

(71) Applicant: Federal Express Corporation, Memphis, TN (US)

(72) Inventor: Jacob W. Springer, Canyon Country, CA (US)

(73) Assignee: Federal Express Corporation, Memphis, TN (US)

(*) Notice: Subject to any disclaimer, the term of this patent is extended or adjusted under 35 U.S.C. 154(b) by 793 days.

This patent is subject to a terminal disclaimer.

(21) Appl. No.: 16/701,330

(22) Filed: Dec. 3, 2019

(65) Prior Publication Data

US 2020/0102094 A1 Apr. 2, 2020

Related U.S. Application Data

(63) Continuation of application No. 15/609,255, filed on May 31, 2017, now Pat. No. 10,532,827.

(51) Int. Cl.
*B64F 1/315* (2006.01)
*E06C 1/383* (2006.01)
(Continued)

(52) U.S. Cl.
CPC .............. *B64F 1/315* (2013.01); *E04G 27/00* (2013.01); *E06C 1/383* (2013.01); *E06C 1/397* (2013.01);
(Continued)

(58) Field of Classification Search
CPC .......... B64F 1/315; E04G 27/00; E06C 1/397; E06C 1/383; E06C 5/02; E06C 5/04; E06C 5/06; E06B 7/08
See application file for complete search history.

(56) References Cited

U.S. PATENT DOCUMENTS 3,698,511 A * 10/1972 Dohan ...................... E04G 1/14
182/119
3,768,592 A * 10/1973 Higgins .................... E06C 1/16
248/238
(Continued)

FOREIGN PATENT DOCUMENTS

CA 2775593 A1 * 10/2012 ........... B63B 27/146
CA 2775593 A1 10/2012
(Continued)

*Primary Examiner* — Marcus Menezes
(74) *Attorney, Agent, or Firm* — Finnegan Henderson, Farabow, Garrett & Dunner LLP

(57) ABSTRACT

A modular staircase is disclosed. The modular staircase includes a first staircase section having a plurality of steps and a first support member detachably connected to the first staircase section. Further, the modular staircase includes a second stair module having a second staircase section including a plurality of steps and a second support member detachably connected to the second staircase section and to the first support member. The modular staircase further includes a third stair module having a third staircase section including a plurality of steps and a retractable third support member detachably connected to the third staircase section and to the second support member. The third support member may be configured to raise or lower the third staircase section relative to the second staircase section.

11 Claims, 15 Drawing Sheets

(51) Int. Cl.
  *E06C 5/02* (2006.01)
  *E06C 5/06* (2006.01)
  *E06C 1/397* (2006.01)
  *E06C 5/04* (2006.01)
  *E04G 27/00* (2006.01)

(52) U.S. Cl.
  CPC ............... *E06C 5/02* (2013.01); *E06C 5/04* (2013.01); *E06C 5/06* (2013.01)

(56) References Cited

U.S. PATENT DOCUMENTS

| | | | | |
|---|---|---|---|---|
| 4,044,857 A * | 8/1977 | Guerette | ............... | E06C 1/397 182/127 |
| 4,427,093 A * | 1/1984 | Wehmeyer | ............... | B66F 11/04 182/208 |
| 5,111,907 A * | 5/1992 | Kishi | ............... | B66F 11/04 182/127 |
| 5,141,078 A * | 8/1992 | Wood | ............... | E04G 1/152 182/119 |
| 6,053,284 A * | 4/2000 | Fountain | ............... | E06C 7/423 182/180.2 |
| 6,085,867 A * | 7/2000 | Daniel, III | ............... | E04F 11/112 182/115 |
| 6,951,265 B2 * | 10/2005 | Frame | ............... | E06C 1/39 182/127 |
| 9,109,394 B2 * | 8/2015 | Hernandez | ............... | E06C 5/04 |
| 9,308,869 B1 * | 4/2016 | Owens, Jr. | ............... | E04G 1/28 |
| 9,803,422 B2 * | 10/2017 | Johnson | ............... | E06C 1/397 |
| 10,100,575 B1 * | 10/2018 | Neubauer | ............... | E06C 7/50 |
| 10,532,827 B2 * | 1/2020 | Springer | ............... | E06C 1/383 |
| 2007/0068732 A1 * | 3/2007 | Nagle | ............... | E06C 7/08 182/121 |
| 2007/0262567 A1 * | 11/2007 | Benson | ............... | E04G 1/34 280/656 |
| 2011/0079465 A1 * | 4/2011 | Karanouh | ............... | E04G 27/00 182/115 |
| 2012/0073902 A1 * | 3/2012 | Honeycutt | ............... | E04G 1/15 182/113 |
| 2013/0292205 A1 * | 11/2013 | Frick | ............... | E06C 7/42 182/156 |
| 2013/0319794 A1 | 12/2013 | Hernandez | | |
| 2014/0076660 A1 * | 3/2014 | William | ............... | E06C 1/397 182/180.2 |
| 2014/0186096 A1 * | 7/2014 | Collin | ............... | F16C 11/04 403/66 |
| 2014/0231171 A1 * | 8/2014 | Kerr | ............... | E06C 7/46 182/108 |
| 2015/0114754 A1 * | 4/2015 | Mountain | ............... | E06C 1/58 182/159 |
| 2017/0275888 A1 * | 9/2017 | Honeycutt | ............... | E04F 11/025 |
| 2018/0094484 A1 * | 4/2018 | Frame | ............... | E06C 1/20 |
| 2020/0024900 A1 * | 1/2020 | Froese | ............... | E06C 1/38 |

FOREIGN PATENT DOCUMENTS

| | | | | |
|---|---|---|---|---|
| CH | 430985 A | 2/1967 | | |
| DE | 3939076 A1 | 5/1991 | | |
| DE | 19738809 A1 * | 3/1999 | ............... | E04G 27/00 |
| DE | 19738809 A1 | 3/1999 | | |
| FR | 2745544 A1 * | 9/1997 | ............... | E06C 1/16 |
| WO | WO-0061891 A1 * | 10/2000 | ............... | E04G 1/154 |
| WO | WO 2008/138041 A1 | 11/2008 | | |

* cited by examiner

MODULAR STAIRCASE

CROSS REFERENCE TO RELATED APPLICATIONS

This application is a continuation application of and claims the benefit of priority to U.S. patent application Ser. No. 15/609,255, filed on May 31, 2017, which is hereby incorporated by reference in its entirety.

FIELD

The present disclosure relates generally to a staircase, and more particularly, to a modular staircase that can be assembled and disassembled without tools, and that may be stowed away in a limited amount of space. The disclosure also relates to a method of assembly of the modular staircase.

BACKGROUND

Staircases are often used to allow passengers to walk from the tarmac to the passenger compartment of an aircraft. Similarly, staircases allow cargo handlers to walk from the tarmac into a cargo hold of the aircraft. The staircases used to access the passenger compartment or cargo hold of the aircraft are typically stored in a hangar or on the tarmac at an airport facility. The staircases are also often equipped with wheels so that they may be transported from their storage locations to adjacent the aircraft. In some instances the staircases may be mounted on a vehicle capable of travelling from a hangar or other waiting area of an airport to the aircraft. The vehicle may also be capable of raising the staircase to a height suitable for a person to access the aircraft passenger compartment or cargo hold via the staircase.

Such movable staircases are heavy, expensive, and also require at least a paved or unpaved pathway over which the staircase can be moved from its storage/parking area to the aircraft. Although this is not generally a problem at many modern airports, some airports in remote and/or undeveloped parts of the world may still not be equipped with wheeled staircases and/or with adequate pathways that may allow a wheeled staircase to be transported from a hangar/storage area to the aircraft.

One example of an aircraft that may travel to such remote and underdeveloped airports is the Flying Eye Hospital of Orbis (http://www.orbis.org). The flying eye hospital is housed in an aircraft, in which the passenger compartment serves as a mobile eye clinic, and the cargo compartment serves as a storage area for medical supplies and other equipment. Once the Orbis aircraft lands at an airport, patients will require a staircase and/or ramp to climb up from the tarmac to the passenger compartment to receive treatment. Likewise, medical personnel will require a staircase to deplane and/or climb up from the tarmac to the cargo hold to retrieve medical supplier or equipment.

There is a need for a staircase that can be easily disassembled and stored in the cargo hold of the aircraft, particularly when the aircraft travels to remote or underdeveloped airports or landing areas. This may allow the staircase to be used even at airfields that may not be equipped with wheeled staircases or may not have ground facilities to provide staircases to access the passenger or cargo compartments of an aircraft. The modular staircase of the present disclosure represents an improvement over the prior art and solves one or more of the problems set forth above and/or other problems of the prior art.

SUMMARY

In one aspect, the present disclosure is directed to a modular staircase. The modular staircase may include a first stair module. The first stair module may include a first staircase section having a first plurality of steps progressing from a first proximal end to a first distal end. The first stair module may also include a foldable first support member detachably connected proximate to the first distal end. The first support member may be configured to position the first distal end at a level higher than the first proximal end. The modular staircase may include a second stair module. The second stair module may include a second plurality of steps progressing from a second proximal end to a second distal end. The second stair module may be detachably connected to the first stair module.

In another aspect, the present disclosure is directed to another modular staircase. The modular staircase may include a first stair module. The first stair module may include a first staircase section having a first plurality of steps progressing from a first proximal end to a first distal end. The first stair module may also include a foldable first support member detachably connected proximate to the first distal end. The first support member may be configured to position the first distal end at a level higher than the first proximal end. The modular staircase may further include a second stair module. The second stair module may include a second staircase section having a second plurality of steps progressing from a second proximal end to a second distal end. The second staircase section may be detachably connected to the first stair module at the second proximal end. The second stair module may also include a foldable second support member detachably connected proximate to the second distal end. The second support member may be configured to position the second distal end at a level higher than the second proximal end.

In yet another aspect the present disclosure is directed to yet another modular staircase. The modular staircase may include a first stair module. The first stair module may include a first staircase section having a first plurality of steps progressing from a first proximal end to a first distal end. The first stair module may also include a first support member detachably connected proximate to the first distal end. The first support member may be configured to position the first distal end at a first level higher than the first proximal end. The modular staircase may further include a second stair module detachably connected to the first stair module. The second stair module may include a second staircase section having a second plurality of steps progressing from a second proximal end to a second distal end. The second stair module may also include a second support member detachably connected proximate to the second distal end. The second support member may be configured to position the second distal end at a second level higher than the first level. The modular staircase may also include a third stair module detachably connected to the second stair module. The third stair module may include a third staircase section having a third plurality of steps progressing from a third proximal end to a third distal end. The third stair module may also include a retractable third support member configured to raise or lower the third distal end relative to the second distal end.

In yet another aspect the present disclosure is directed to a method of assembling a modular staircase. The method may include raising a first proximal end of a first staircase section relative to a first distal end of the first staircase section. The first staircase section may include a first plurality of steps. The method may further include detachably connecting a first support member between the proximal end and the distal end of the first staircase section. The method may also include detachably connecting a second staircase section to the first staircase section. The second staircase section may include a second plurality of steps. Further the method may include detachably connecting a second support member to the second staircase section and to the first support member. The method may also include detachably connecting a third staircase section to the second staircase section. The third staircase section may include a third plurality of steps. The method may include connecting opposite ends of an actuator to the staircase section and the second support member. In addition, the method may include adjusting a length of the actuator to adjust a height of the third staircase section relative to the first and second staircase sections.

BRIEF DESCRIPTION OF THE DRAWINGS

The accompanying drawings, which are incorporated in and constitute a part of this disclosure, illustrate exemplary disclosed embodiments of the present disclosure and, together with the description, serve to explain the principles of the present disclosure. In the drawings.

DETAILED DESCRIPTION

Figure 1:
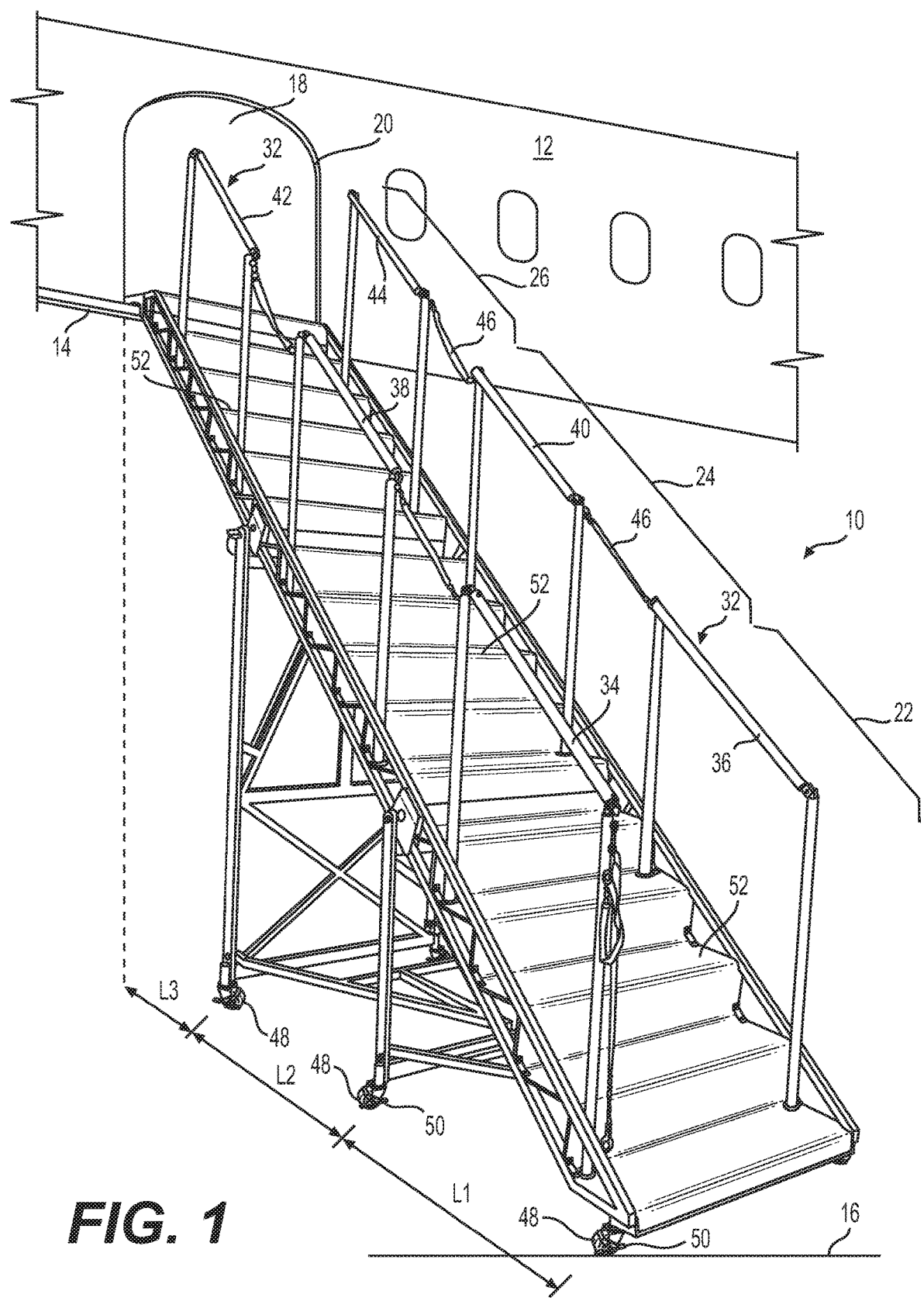
FIG. 1 is a perspective view illustrating an exemplary modular staircase attached to an elevated structure such as an aircraft.

FIG. 1 illustrates a perspective view of an exemplary modular staircase 10 located adjacent to and attached to an elevated structure 12. In one exemplary embodiment as illustrated in FIG. 1, elevated structure 12 may be an aircraft. Aircraft 12 may be a cargo aircraft, a passenger aircraft, a military transport aircraft, a medical aircraft, or any other type of aircraft capable of transporting cargo. Modular staircase 10 may be detachably attached to mounting member, such as mounting bar 14, which may be part of or affixed to aircraft 12. In one exemplary embodiment, mounting bar 14 may be a cargo door latch spool of aircraft 12. In other exemplary embodiments, the mounting member may be a bar, a lip, an opening, or a protrusion.

Modular staircase 10 may allow a person to climb up from tarmac 16 to compartment 18 of aircraft 12 via doorway 20. Although FIG. 1 illustrates compartment 18 as a passenger compartment of aircraft 12, it is contemplated that compartment 18 may be a cargo hold of aircraft 12. It is also contemplated that modular staircase 10 may additionally or alternatively be used for climbing from the ground to other types of elevated structures 12. By means of example only, modular staircase 10 may be used to climb up from the ground to an upper shelf of a storage rack, to an elevated platform or portion of a building, to a cargo container stacked on top of another cargo container or structure, or to a roof of a vehicle or a building.

Modular staircase 10 may include one or more detachable stair modules, and each of the stair modules may include component parts that can be dissembled. In addition, the stair modules or components of the stair modules may be foldable, to minimize the space required to store the respective modules and/or ease the assembly of the stair modules and the modular staircase. For example, as illustrated in FIG. 1, modular staircase 10 may include first stair module 22, second stair module 24, and third stair module 26. It is contemplated, however, that modular staircase may have greater than or fewer than the three stair modules 22, 24, and 26. First, second, and third stair modules 22, 24, and 26 may have lengths "$L_1$," "$L_2$," and "$L_3$," respectively which may be equal or unequal. The terms "first," "second," and "third" as used in this disclosure should not be interpreted as implying relative positions or a numerical quantity. Instead, the terms "first," "second," and "third" are used in this disclosure merely to differentiate between similarly named features, for example, "stair modules."

Each of first, second, and third stair modules 22, 24, and 26 may include one or more handrails 32. For example, as illustrated in FIG. 1, first stair module 22 may include left handrail 34 and right handrail 36; second stair module 24 may include left hand rail 38 and right hand rail 40; and third stair module may include left hand rail 42 and right hand rail 44. The terms left and right as used in this disclosure do not represent a particular orientation or position but instead only indicate relative positions between two handrails. Additionally, although each of first, second, and third stair modules 22, 24, and 26 have been illustrated in FIG. 1 as having two handrails, it is contemplated that in some exemplary embodiments, first, second, and third stair modules 22, 24, and 26 may have only one handrail (either the left handrail or the right handrail). For example, modular staircase 10 may have only left handrails 34, 38, and 42, or only right handrails 36, 40, and 44 when modular stair case is positioned alongside a tall wall, requiring handrails on only one side of modular staircase 10.

Safety straps 46 may be detachably connected to adjacent handrails. Thus, for example, as illustrated in FIG. 1, safety straps 46 may be disposed between left hand rails 34 and 38, and/or between left handrails 38 and 42. Likewise, safety straps 46 may be disposed between right hand rails 36 and 40, and/or between right handrails 40 and 44. One or more of first, second, and third stair modules 22, 24, and 26 may also include one or more wheels 48, which may allow modular staircase 10 to be moved on tarmac 16 or the ground or floor where the module staircase will be used. Wheel 48 may be a castor wheel equipped with lever 50, which may be configured to stop rotation of wheel 48, thereby preventing movement of modular staircase 10 on tarmac 16. Each of first, second, and third stair modules 22, 24, and 26 may also include one or more steps 52, preferably a plurality of steps.

Figure 2:
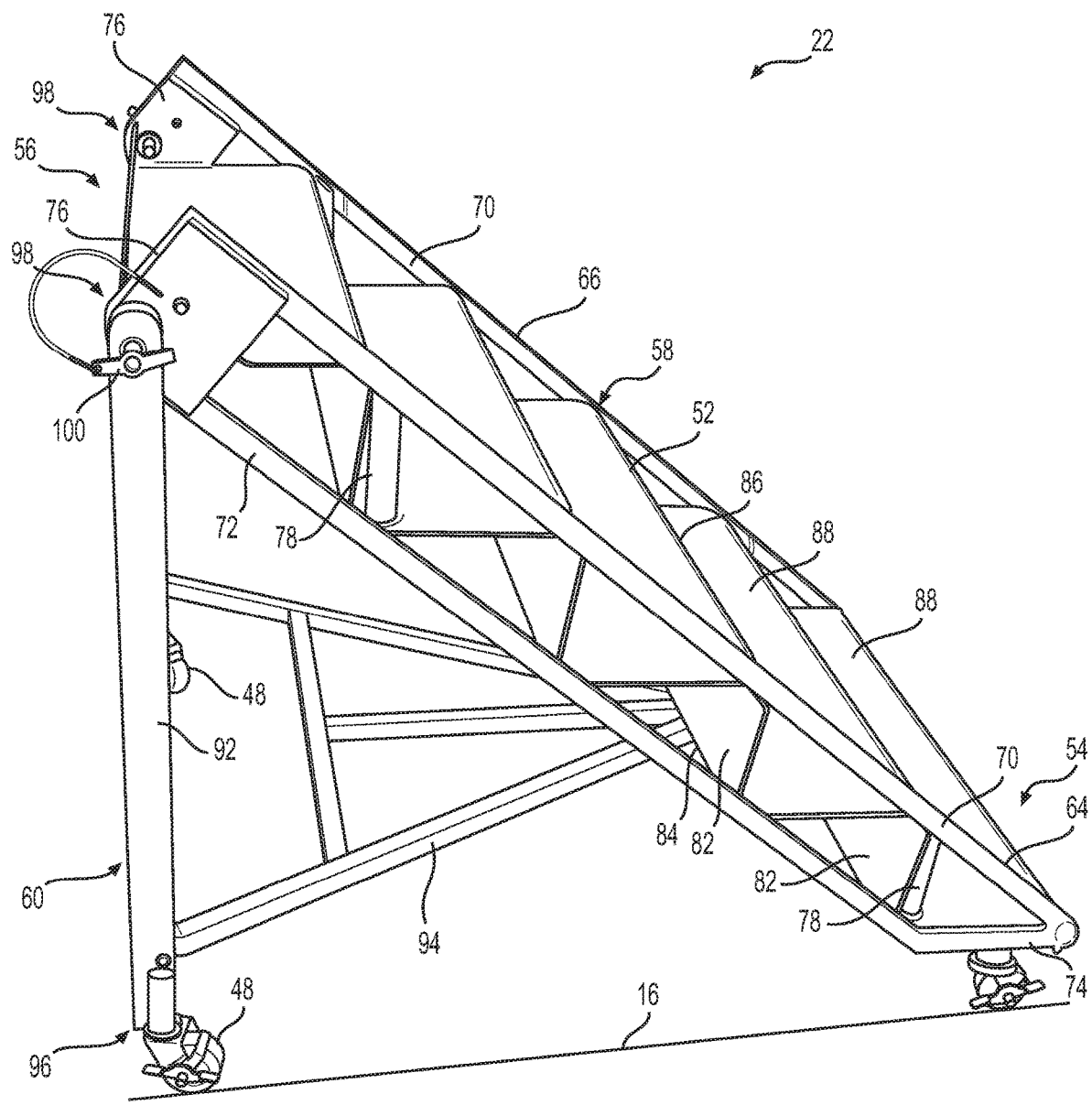
FIG. 2 is a perspective view of an exemplary disclosed stair module of the staircase of FIG. 1.

FIG. 2 illustrates an exemplary embodiment of first stair module 22. Left and right handrails 34 and 36 of first stair module 22 have been omitted from FIG. 2 for clarity. First stair module 22 may extend from first proximal end 54 to first distal end 56. First stair module may include first staircase section 58 and first support member 60. First staircase section 58 may include one or more steps 52 progressing from first proximal end 54 to first distal end 56. First staircase section 58 may also include left side rail 64 and right side rail 66 disposed opposite to and spaced apart from left side rail 64. Both left and right side rails 64 and 66 may extend from adjacent first proximal end 54 to adjacent first distal end 56.

In one exemplary embodiment as illustrated in FIG. 2, left and right side rails 64 and 66 may include beam members 70 and 72 disposed generally parallel to each other. Rail end 74 may be connected to free ends of beam members 70 and 72 adjacent first proximal end 54. Similarly, rail ends 76 may be connected to free ends of beam members 70 and 72 adjacent first distal end 56. Left and right side rails 64 and 66 may also include cross members 78 connected to beam members 70 and 72 at one or more spaced apart locations. In some exemplary embodiments, cross members 78 may additionally or alternatively be connected to one or more of steps 52.

In one exemplary embodiment as illustrated in FIG. 2, steps 52 of first staircase section 58 may include plates 82 spaced apart from and disposed generally parallel to each other. Each plate 82 may extend from bottom edge 84 to top edge 86 disposed opposite to and spaced apart from bottom edge 84. Steps 52 may also include plates 88 spaced apart from and disposed generally parallel to each other. Each plate 88 may extend between bottom edge 84 of a plate 82 and top edge 86 of an adjacent plate 82. In one exemplary embodiment, adjacent plates 82 and 88 may be disposed generally perpendicular to each other, although other angles between plates 82 and 88 are also contemplated. For example, in some embodiments, adjacent plates 82 and 88 may be inclined relative to each other at angles ranging between about 80° and 85°. In some exemplary embodiments, plates 82 and 88 may form a unitary integrated structure of first staircase section 58.

As used in this disclosure the term "generally perpendicular" encompasses mechanical structures that are oriented at angles ranging between 90°±1° relative to each other. Similarly, the term "generally parallel encompasses mechanical structures that are oriented at angles ranging between 0°±1° relative to each other. The term about as used in this disclosure indicates that the specified numerical values encompass typical manufacturing and design tolerances. Thus, for example, an angle of about 80° includes angles of 80°±1°.

First stair module 22 may include first support member 60, which may be foldable. First support member 60 may include first support brace 92 and first connector brace 94. First support brace 92 may extend from first end 96 to second end 98. In one exemplary embodiment as illustrated in FIG. 2, first end 96 may be disposed adjacent tarmac 16 and second end 98 may be disposed adjacent first distal end 56. First support brace 92 may be detachably and pivotably connected to left side rail 64 and right side rail 66 adjacent second end 98 via pins 100. In one exemplary embodiment as illustrated in FIG. 2, pins 100 may be generally T-shaped pip-pins 100. One or more wheels 48 may be attached to first support brace 92 adjacent first end 96 and to first staircase section 58 adjacent first proximal end 54. First support brace 92 may be configured to raise first distal end 56 of first stair module 22 to a level (or height) greater than a level of first proximal end 54 of first stair module 22.

Figure 3:
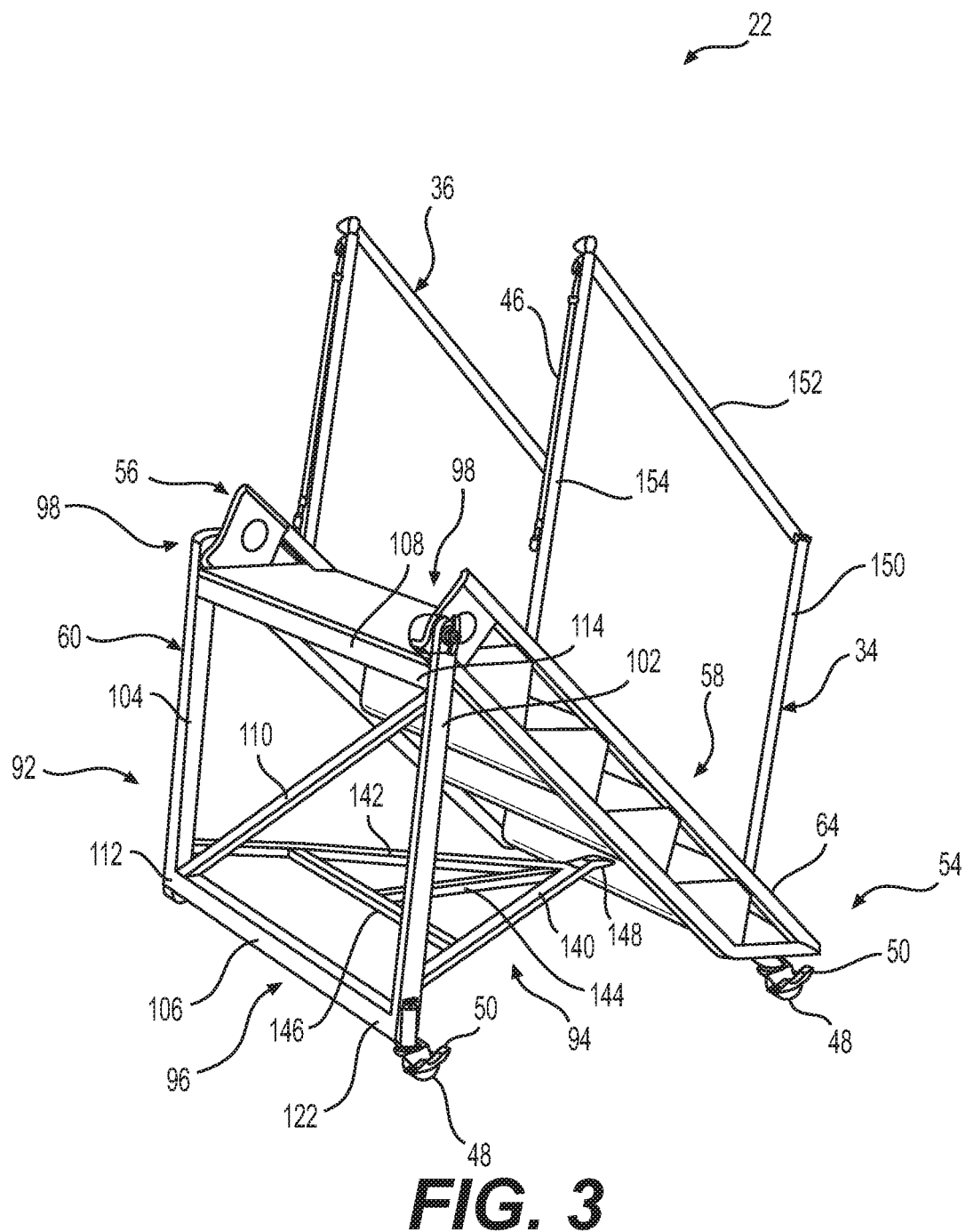
FIG. 3 is another perspective view of the exemplary disclosed stair module of FIG. 2.

In one exemplary embodiment, first support brace 92 may be formed in the form of a truss. For example, as illustrated in FIG. 3, first support brace 92 may include beam members 102, 104, 106, and 108, and cross beam member 110. Beam members 102 and 104 may be disposed generally parallel to and spaced apart from each other. Beam members 106 and 108 may also be disposed generally parallel to and spaced apart from each other. Beam members 102 and 104 may extend from adjacent first end 96 to adjacent second end 98. Wheels 48 may be attached to beam members 102 and 104 adjacent first end 96 of first support brace 92. Opposite ends of beam member 106 may be connected to beam members 102 and 104, adjacent first end 96. Likewise, opposite ends of beam member 108 may be connected to beam members 102 and 104, adjacent second end 98. Thus, beam members 102, 104, 106, and 108 may form a generally rectangular or rhomboidal shape. Although beam members 102 and 104 are illustrated as being disposed generally perpendicular to beam members 106 and 108, respectively, in FIG. 3, it is contemplated that beam members 102, 104, 106, and 108 may be disposed inclined relative to each other. Cross beam member 110 may be diagonally connected between corner 112 adjacent first end 96 and corner 114 adjacent second end 98 of beam member 102.

Figure 4:
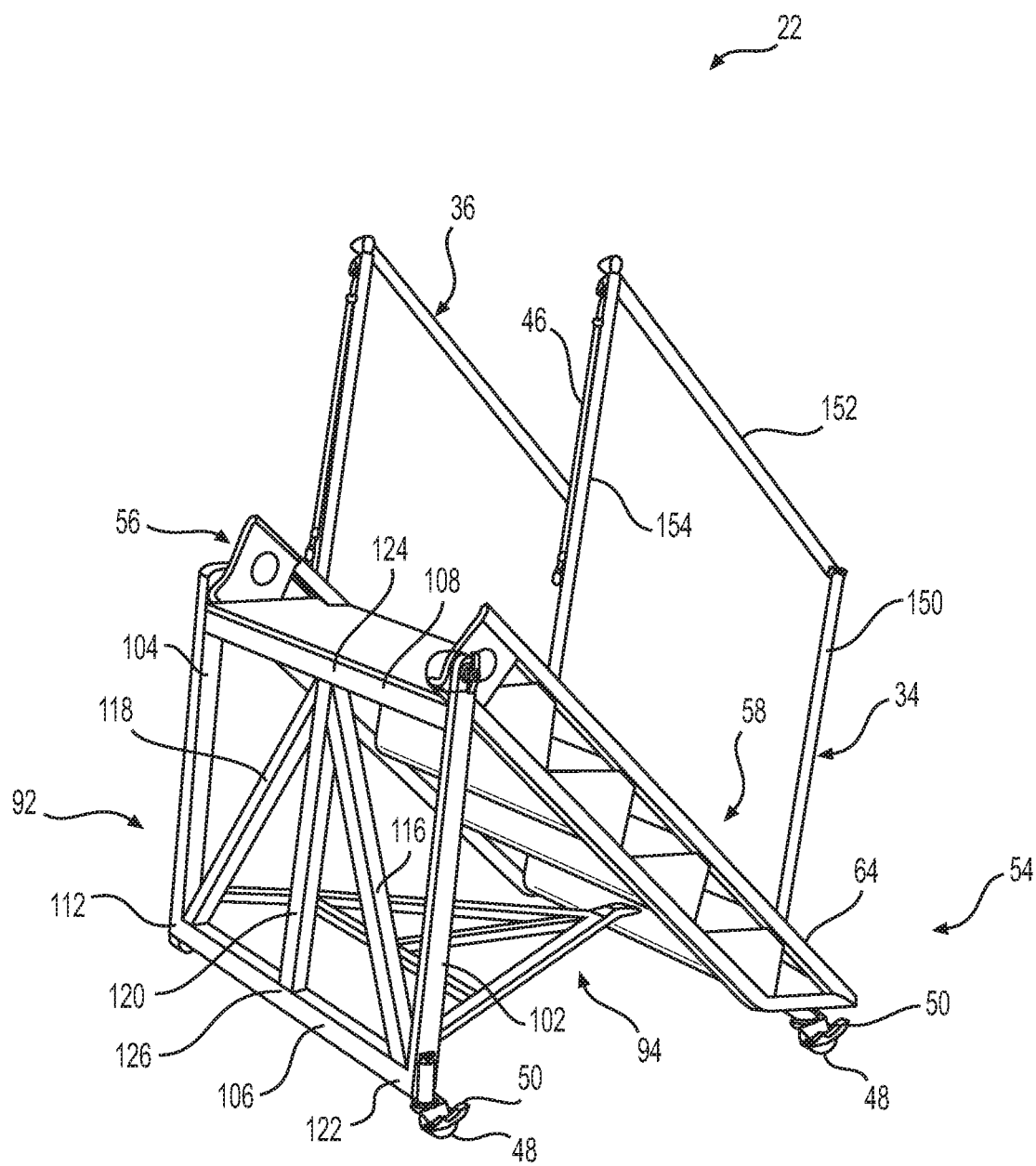
FIG. 4 is yet another perspective view of the exemplary disclosed stair module of FIG. 2.

Although FIG. 3 illustrates an exemplary truss configuration, other truss configurations are also contemplated. For example, FIG. 4 illustrates another exemplary truss configuration for first support brace 92. In this exemplary embodiment, the truss configuration may include beam members 102, 104, 106, and 108, and cross beam members 116, 118, and 120. Beam members 102, 104, 106, and 108 may form a generally rectangular or rhomboidal shape.

One end of cross beam member 116 may be connected to beam members 104 and 106 at corner 122, adjacent first end 96. An opposite end of cross beam member 116 may be connected to beam member 108 at position 124, which may be disposed about halfway between ends of beam member 108. One end of cross beam member 118 may be connected at corner 112 formed by beam members 104 and 106 adjacent first end 96. An opposite end of cross beam member 118 may be connected to beam member 108 at position 126. Cross beam member 120 may be disposed generally parallel to beam members 102 and 104. One end of cross beam member 120 may be connected to beam member 106 at position 126 disposed about halfway between ends of beam member 106. An opposite end of cross beam member 120 may be connected to beam member 108 at positon 124.

Returning to FIG. 3, first stair module 22 may include first connector brace 94, which may be pivotably connected to first support brace 92 adjacent first end 96. The pivotable connection between first support brace 92 and first connector brace 94, and the detachable connection between first connector brace 94 and first staircase section 58 may help ensure that first support member 60 is foldable about the pivotable connection adjacent first end 96 for stowing and/or storage.

First connector brace 94 may also be detachably connected to first staircase section 58 adjacent first proximal end 54. In one exemplary embodiment, first connector brace 94 may be disposed generally perpendicular to first support brace 92, although other angles between first support brace 92 and first connector brace 94 are also contemplated.

In some exemplary embodiments, first connector brace 94 may be formed in the form of a truss. For example, as illustrated in FIG. 3, first connector brace 94 may include beam members 140, 142, 144, and 146. One end of each of beam members 140, 142, and 144 may be connected to each other forming tip 148. Beam members 140, 142, and 144 may be disposed generally inclined relative to each other. Tip 148 may be detachably connected to first staircase section 58. Beam members 140, 142, and 144 may extend from tip 148 towards first support brace 92. Beam member 140 may be pivotably connected to first support brace 92 adjacent corner 122. Likewise, beam member 142 may be pivotably connected to first support brace 92 adjacent corner 112. Beam member 144 may be disposed between beam members 140 and 142 and may extend from tip 148 towards first support brace 92. Beam member 146 may be disposed generally perpendicular to beam member 144 and generally parallel to beam member 106 of first support brace 92. An end of beam member 144 disposed opposite tip 148 may be connected to beam member 146. Although a particular truss arrangement is described above for first connector brace 94, it is contemplated that first connector brace 94 may have other types of truss arrangements.

First stair module 22 may include left handrail 34 and right handrail 36, which may be disposed opposite first support member 60. For example, as illustrated in FIG. 3, first support member 60 may be disposed on a side of first staircase section 58, which may be nearer tarmac 16, whereas left and right handrails 34 and 36 may be disposed on an opposite side of first staircase section 58 further from tarmac 16. Left handrail 34 may include link members 150, 152, and 154, which may be in the form of elongated bars or rods. It is contemplated that link members 150, 152, and 154 may be solid or may be tubular and may have cross-sections, which may be circular, elliptical, polygonal, or of any shape known in the art. Ends of link members 150 and 154 may be detachably attachable to left side rail 64. For example, left side rail 64 may include a slot (not shown) capable of receiving link members 150 and 154. In some exemplary embodiments, link members 150 and 154 may be received in openings in cross members 78 (see FIG. 2) of left side rail 64. Link member 152 may be pivotably connected to free ends of link members 150 and 154. Thus detaching link members 150 and 154 from left side rail 64 may help ensure that left handrail 34 may be folded for storage by pivoting link members 150 and 154 about their ends attached to link member 152.

Left handrail 34 may also include safety strap 46, which may be detachably attached to link member 154. In one exemplary embodiment, safety strap 46 of left handrail 34 may be equipped with hooks (not shown) that may be attachable to link member 154 of left hand rail 34 and link member 150 of adjacent left handrail 38. Left handrails 38 and 42, and right handrails 36, 40, and 44 may each have a structure similar to that of left handrail 34 described above. Further, left handrails 38 and 42, and right handrails 36, 40, and 44 may each be attached to first staircase section 58 in a manner similar to that discussed above for left handrail 34.

Figure 5:
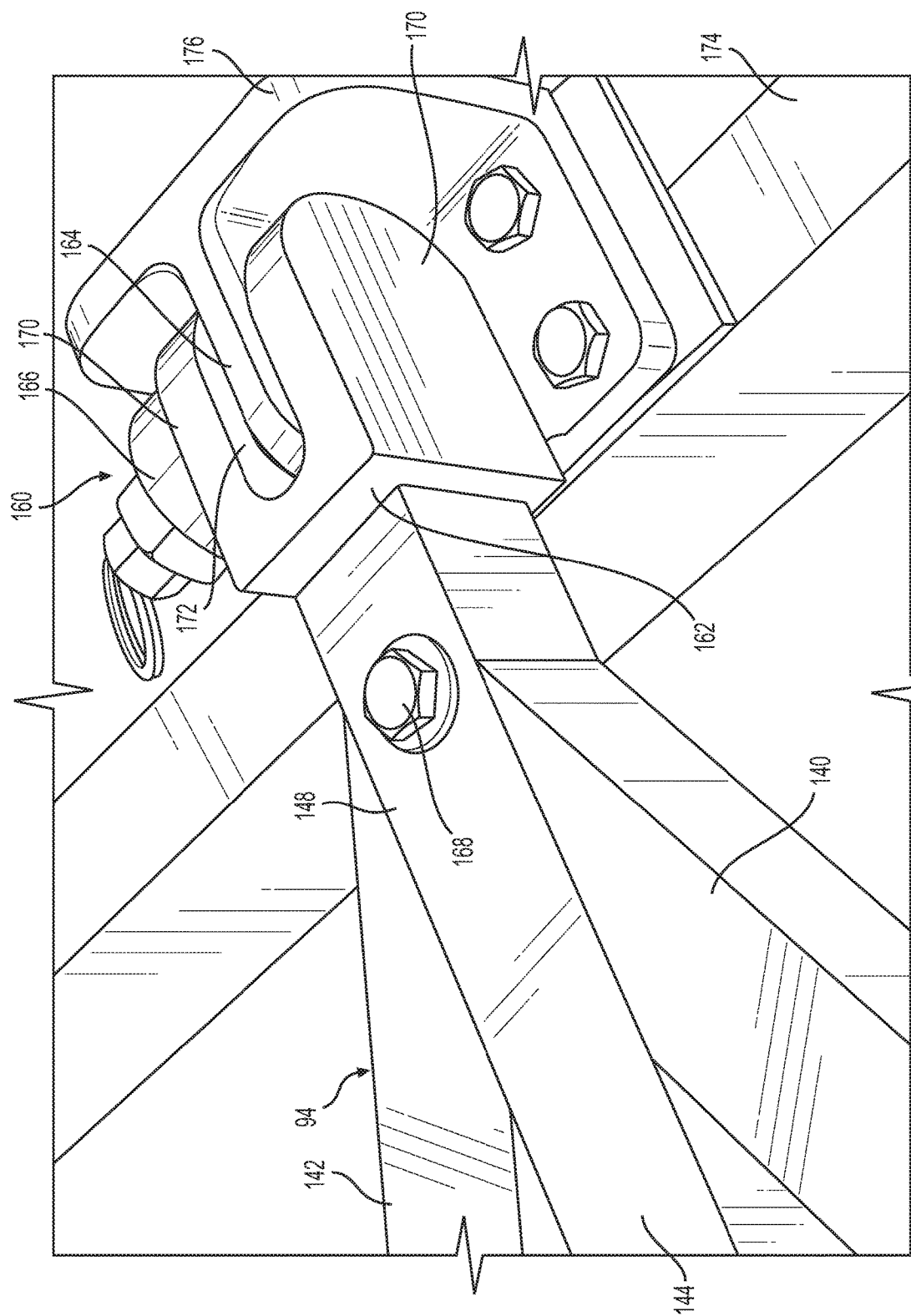
FIG. 5 is a magnified perspective view illustrating an exemplary quick disconnect coupler of the modular staircase of FIG. 1.

FIG. 5 illustrates a magnified perspective view of a quick disconnect coupler 160, which may be used to detachably connect first connector brace 94 with first staircase section 58. In one exemplary embodiment as illustrated in FIG. 5, coupler 160 may include clevis 162, tang 164, and clevis pin 166. Clevis 162 may be attached to tip 148 of first connector brace 94 via fastener 168. It is contemplated, however, that clevis 162 may be attached to tip 148 via rivets, by welding, by brazing, or by any other means of attachment known in the art. Clevis 162 may include a pair of projections 170 disposed spaced apart from each other to form a gap 172, which may be configured to receive tang 164.

First staircase section 58 may include beam member 174. In one exemplary embodiment as illustrated in FIG. 5, tang 164 may be attached to a generally L-shaped bracket 176 connected to beam member 174. Tang 164 may project from the legs of L-shaped bracket 176 and may be disposed generally perpendicular to the legs of L-Shaped bracket 176. It is contemplated that in some exemplary embodiments, L-shaped bracket 176 may be attached to one of plates 82 or 88 on a side of plate 82 or 88 facing first support brace 92. It is also contemplated that in other exemplary embodiments, coupler 160 may not include L-shaped bracket 176, and instead tang 164 may project from beam member 174, or from one of plates 82 or 88 of first staircase section 58. Projections 170 and tang 164 may include openings (not shown), which may align with each other when tang 164 is received in gap 172 of clevis 162. Clevis pin 166 may pass through the openings in the projections 170 and in tang 164 to detachably connect first connector brace 94 to first staircase section 58.

Figure 6:
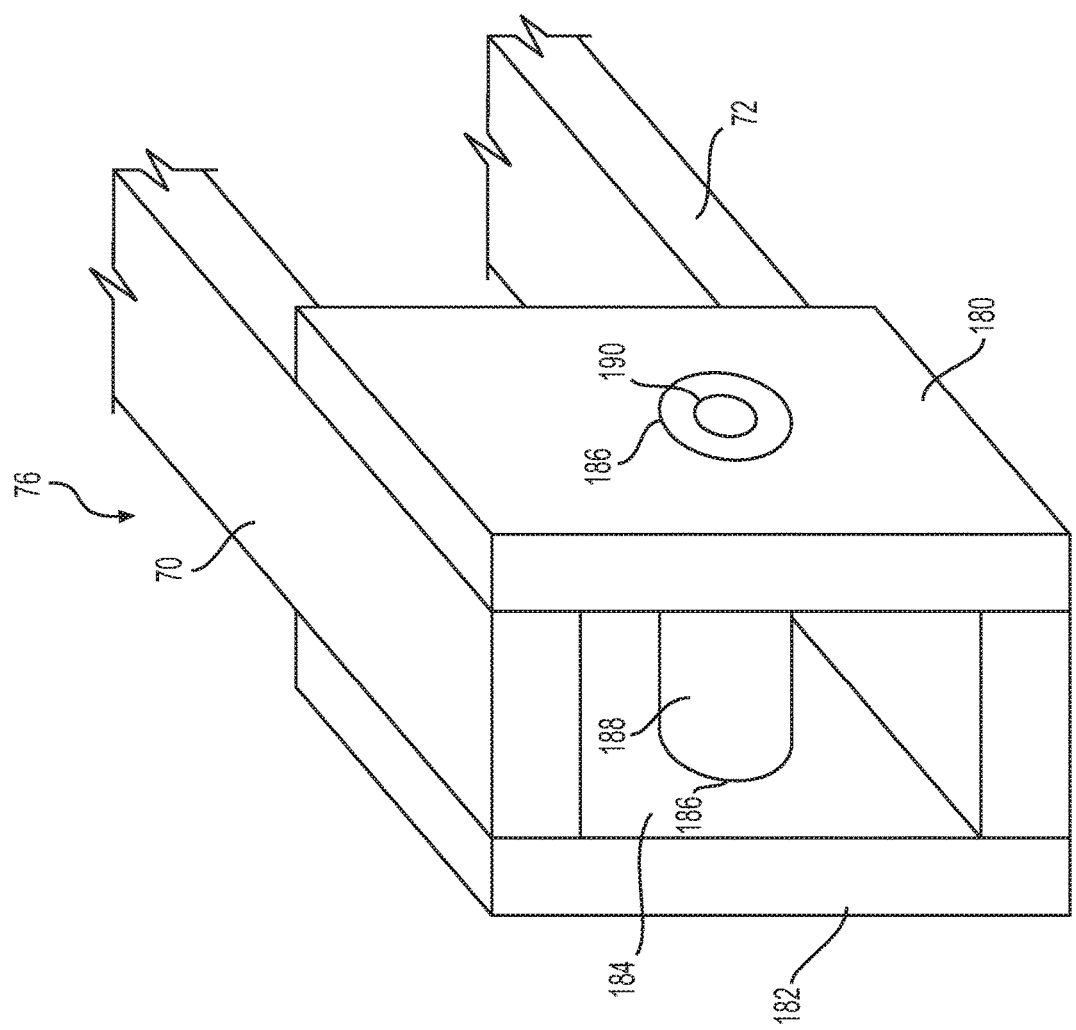
FIG. 6 is a magnified perspective view of a rail end of a stair module of the modular staircase of FIG. 1.

FIG. 6 illustrates a magnified perspective view of an exemplary embodiment of rail end 76 of left side rail 64 or right side rail 66. Rail end 76 may include beam members 70 and 72, which may be sandwiched between plates 180 and 182. Beam members 70 and 72 may be attached to plates 180 and 182. Beam members 70 and 72, and plates 180 and 182 may be separated from each other by gap 184. Plate 180 may include an opening 186 which may pass through a thickness of plate 180. Similarly, plate 182 may include opening 186 which may pass through a thickness of plate 182. Mounting bar 188 may pass through openings 186 in plates 180 and 182 and may be connected to plates 180 and 182. Mounting bar 188 may extend in gap 184 between plates 180 and 182. In one exemplary embodiment, mounting bar 188 may have a generally cylindrical shape. It is contemplated however that mounting bar 188 may have an elliptical, polygonal, or any other type of shape. In another exemplary embodiment mounting bar 188 may be hollow and may include mounting hole 190, which may be configured to receive pip-pin 100. For example, referring to FIGS. 3 and 6, mounting holes 190 on rail ends 76 of left side rail 64 and right side rail 66 may be axially and circumferentially aligned with an opening (not shown) in beam members 102 or 104 of first support brace 92. Pip-pins 100 may be insertable through mounting hole 190 and the opening in beam members 102 or 104 to pivotably and detachably attach first support brace 92 to first staircase section 58.

Figure 7:
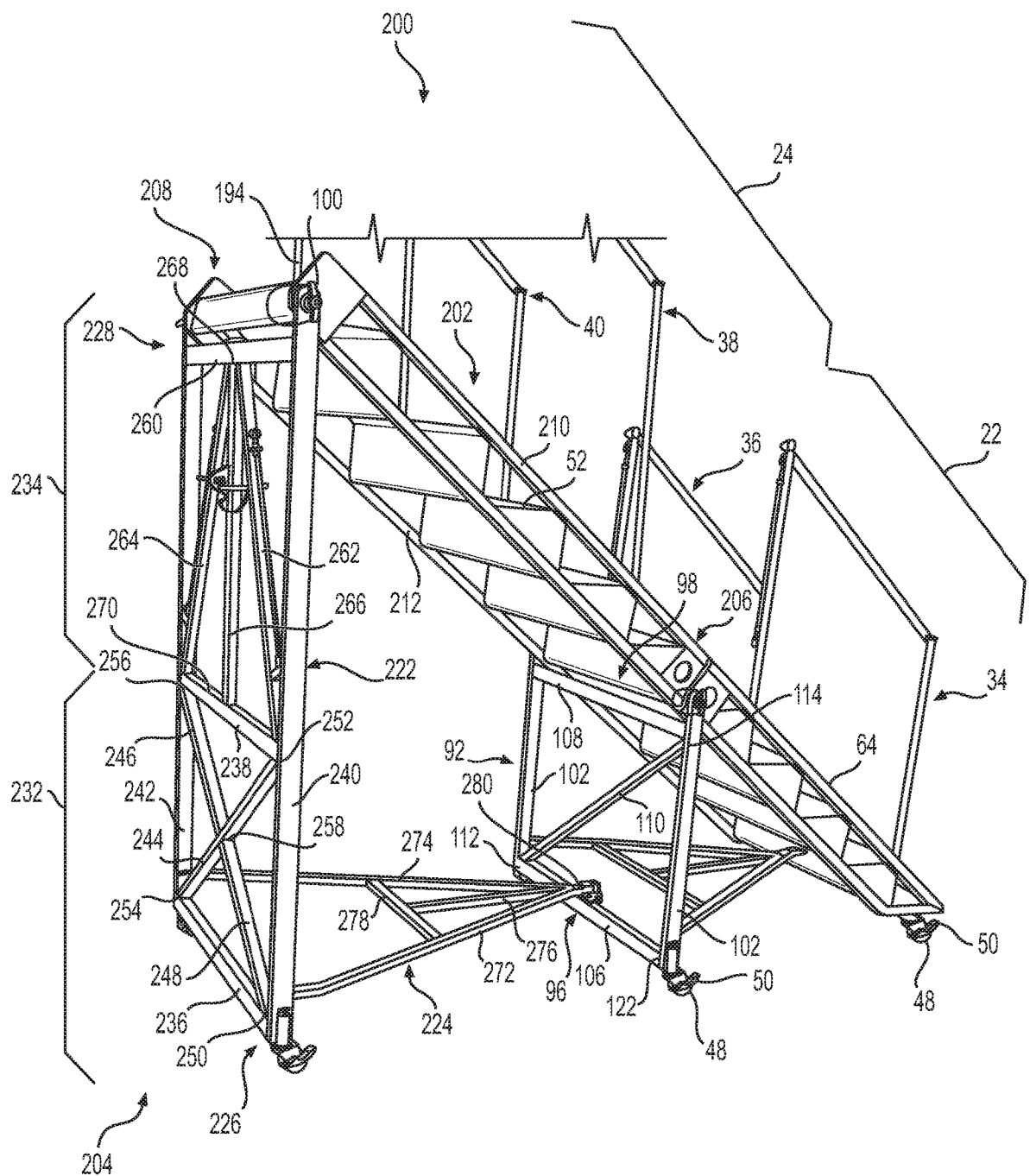
FIG. 7 is a perspective view of an exemplary stair assembly including two stair modules.

FIG. 7 illustrates a perspective view of an exemplary stair assembly 200. In some exemplary embodiments, stair assembly 200 may constitute a portion of modular staircase 10 and may include first stair module 22 and second stair module 24. In other exemplary embodiments, stair assembly 200 may itself be an exemplary embodiment of a modular staircase that may have only two stair modules, namely first stair module 22 and second stair module 24. First stair module 22 of stair assembly 200 may have a structural arrangement and function similar to that described above with respect to FIGS. 2-6.

Second stair module 24 may be detachably connected to first stair module 22. Second stair module 24 may extend from second proximal end 206 to second distal end 208. Second stair module 24 may include second staircase section 202 and second support member 204. Second staircase section 202 may extend from second proximal end 206 to second distal end 208. Second staircase section 202 may also include one or more steps 52, progressing from second proximal end 206 to second distal end 208. Second stair module 24 may include left side rail 210 and right side rail 212 disposed opposite to and spaced apart from left side rail 210. Both left and right side rails 210 and 212 may extend from adjacent second proximal end 206 to second distal end 208. Second staircase section 202 may extend from left side rail 210 to right side rail 212. In one exemplary embodiment as illustrated in FIG. 7, second staircase section 202 may be attached to left side rail 210 and right side rail 212. Steps 52 of second staircase section 202 may have a structure similar to that of steps 52 of first staircase section 58 described above.

Left and right side rails 210 and 212 may have a structure similar to that described above for left and right side rails 64 and 66, respectively. For example, left and right side rails 210 and 212 may each include rail ends 76 disposed adjacent second distal end 208. Each of left and right side rails 210 and 212 may also include bracket 214 disposed adjacent second proximal end 206.

Figure 8:
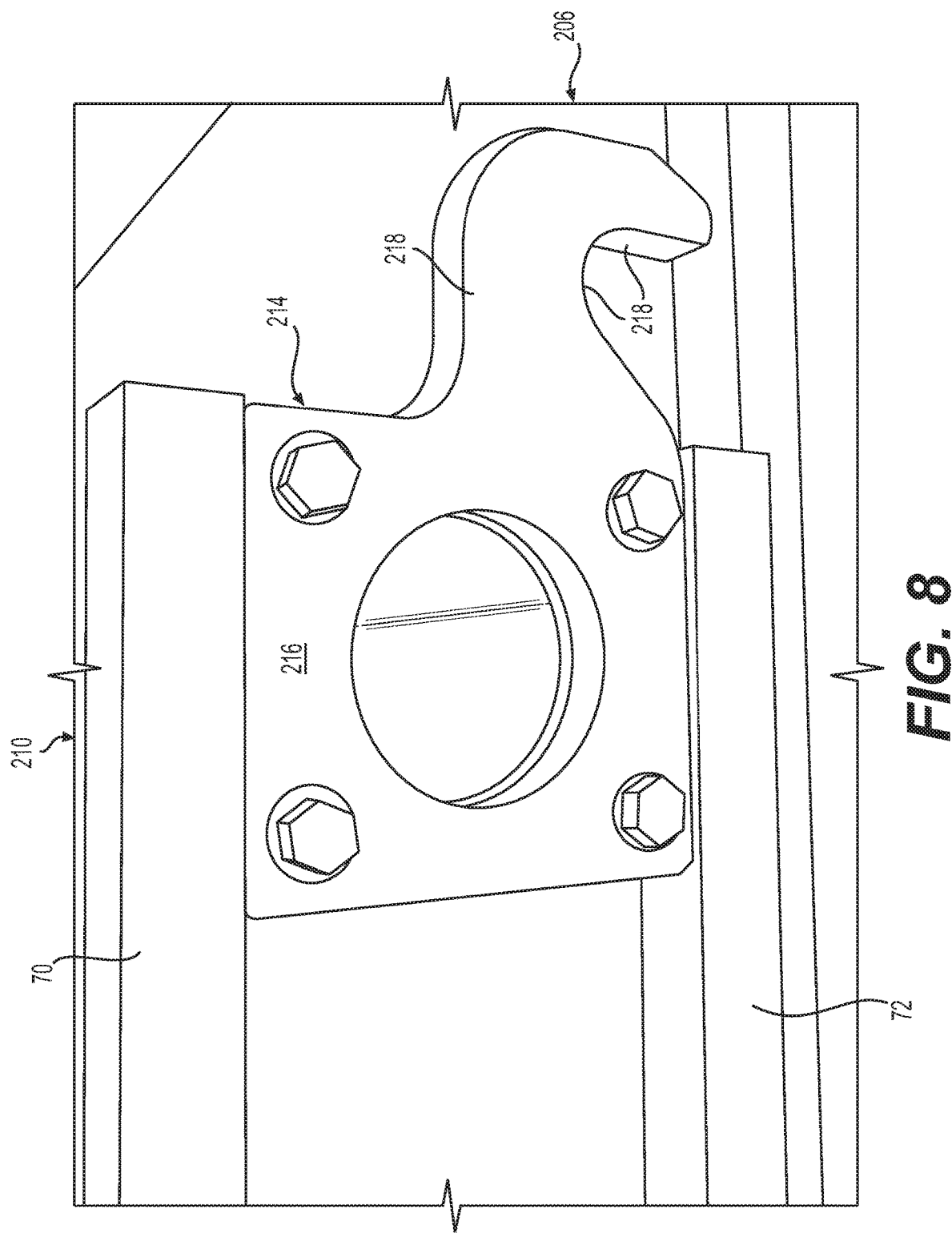
FIG. 8 is a magnified view of a hook used to attach adjacent staircase sections of the modular staircase of FIG. 1.

FIG. 8 illustrates a magnified view of left side rail 210 of an exemplary second staircase section 202, adjacent second proximal end 206. As illustrated in FIG. 8, left side rail 210 may include beam members 70 and 72 disposed generally parallel to and spaced apart from each other. Bracket 214 may be disposed between beam members 70 and 72 adjacent second proximal end 206. Bracket 214 may include base portion 216 and hook 218. Base portion 216 may be detachably or fixedly attached to beam members 70 and 72. Hook 218 may project from base portion 216 towards second proximal end 206. Hook 218 may have an inner surface 220 that may pivotingly engage with an outer surface of mounting bar 188 (see FIG. 6).

Right side rail 212 may also include bracket 214 adjacent second proximal end 206. Hooks 218 of left side rail 210 and right side rail 212 may be configured to engage with mounting bars 188 on rail ends 76 of left side rail 64 and right side rail 66 of the first stair module, respectively. Hooks 218 may help ensure that second staircase section 202 of second stair module 24 may be detachably connected to first stair module 22 adjacent first distal end 56 of the first stair module. Hooks 218 may also help ensure that second staircase section 202 of second stair module 24 may be attachable to first stair module 22 without the need for tools.

Returning to FIG. 7, second support member 204 may be configured to position second distal end 208 at a level (i.e. height) higher than second proximal end 206. Second support member 204 of second stair module 24 may include second support brace 222 and second connector brace 224. Second support brace 222 may extend from first end 226 to second end 228. First end 226 of second support brace 222 may be disposed adjacent tarmac 16 and second end 228 may be disposed adjacent second distal end 208. Second support brace 222 may be detachably and pivotably connected to left side rail 210 and right side rail 212 adjacent second end 228 via pins 100. One or more wheels 48 may be attached to second support brace 222 adjacent first end 226. Second support brace 222 may be configured to raise a level (i.e. height) second distal end 208 of second stair module 24 to a level greater than a level of first distal end 56 of first stair module 22. Second support brace 222 may also raise second distal end 208 of second stair module 24 to a level higher than a level of second proximal end 206 of second stair module 24. In one exemplary embodiment as illustrated in FIG. 7, a height of second support brace 222 may be greater than a height of first support brace 92.

In one exemplary embodiment, second support brace 222 may have a truss configuration similar to the truss configurations described above for first support brace 92. For example, as illustrated in FIG. 7, second support brace 222 may include lower truss 232 and upper truss 234. Lower truss 232 may include beam members 236, 238, 240, and 242, and cross beam members 244, 246, and 248. Beam members 236 and 238 may be disposed generally parallel to and spaced apart from each other. Beam member 236 may be disposed adjacent first end 226, whereas beam member 238 may be disposed between first end 226 and second end 228. Beam members 240 and 242 may be disposed generally parallel to and spaced apart from each other. Beam member 240 may be connected to beam member 236 at corner 250. Beam member 240 may be also connected to beam member 238 at corner 252. Beam member 242 may be connected to beam member 236 at corner 254. Similarly, beam member 242 may be connected to beam member 238 at corner 256. Corners 250, 252, 254, and 256 may define corners of a generally rectangular or rhomboidal truss configuration for lower truss 232. Corner 256 may be disposed diagonally opposite to corner 250, whereas corner 252 may be disposed diagonally opposite to corner 254. Further, corners 250 and 254 may be disposed spaced apart from each other along beam member 240, and corners 254 and 256 may be disposed space apart from each other along beam member 242.

One end of cross beam member 244 may be connected to beam members 236 and 242 at corner 254. An opposite end of cross beam member 244 may be connected to beam members 238 and 240 at corner 252. One end of cross beam member 246 may be connected to beam members 238 and 242 at corner 256. An opposite end of cross beam member 246 may be connected to cross beam member 244 at a position 258 disposed about halfway between corners 252 and 254. One end of cross beam member 248 may be connected to beam members 236 and 240 at corner 250. An opposite end of cross beam member 248 may be connected to cross beam member 244 at position 258.

Although FIG. 7 illustrates an exemplary embodiment of lower truss 232 in which beam members 236 and 238 are disposed generally perpendicular to beam members 240 and 242, it is contemplated that beam members 236, 238, 240, and 242 may be disposed generally inclined relative to each other. Additionally, truss configurations other than the configuration illustrated in FIG. 7 are contemplated for lower truss 232. For example, lower truss 232 may have a truss configuration similar to that of first support brace 92 as illustrated in the exemplary embodiments of FIG. 3 or 4.

Upper truss 234 may include beam members 260, 262, 264, and 266. Beam member 260 may be disposed adjacent second end 228. Beam member 260 may be disposed generally parallel to beam members 236 and 238. Opposite ends of beam member 260 may be connected to beam members 240 and 242. One end of beam member 262 may be connected to beam members 238 and 240 at corner 252. An opposite end of beam member 262 may be connected to beam member 260 at position 268 disposed about halfway between opposite ends of beam member 260. One end of beam member 264 may be connected to beam members 238 and 242 at corner 256. An opposite end of beam member 264 may be connected to beam member 260 at position 268. Beam member 266 may extend from position 268 towards beam member 238 and may be connected to beam member 238 at position 270 disposed about halfway between opposite ends of beam member 238. Truss configurations other than the configuration illustrated in FIG. 7 are contemplated for upper truss 234. For example, upper truss 234 may have a truss configuration similar to that of lower truss 232 or of first support brace 92 as illustrated in the exemplary embodiments of FIG. 3 or 4.

Second connector brace 224 may be pivotably connected to second support brace 222 adjacent first end 226. The pivotable connection between second support brace 222 and second connector brace 224 may allow second support member 204 to be foldable for stowing/storage. Second connector brace 224 may be detachably connected to first support brace 92 adjacent first end 96 of first support brace 92. In one exemplary embodiment as illustrated in FIG. 7, second connector brace 224 may be disposed generally perpendicular to second support brace 222, although other angles between second support brace 222 and second connector brace 224 are also contemplated.

In some exemplary embodiments, second connector brace 224 may be formed in the form of a truss. For example, as illustrated in FIG. 7, second connector brace 224 may include beam members 272, 274, 276, and 278. One end of each of beam members 272, 274, and 276 may be connected forming tip 280. Beam members 272, 274, and 276 may be disposed generally inclined relative to each other. Tip 280 may be detachably connected to first support brace 92. In one exemplary embodiment, tip 280 may be connected to first support brace 92 via quick disconnect coupler 160. It is contemplated, however, that tip 280 may be connected to first support brace 92 using hooks, fasteners, or other quick-disconnect couplers.

Beam members 272, 274, and 276 may extend from tip 280 towards second support brace 222. Beam member 272 may be pivotably connected to second support brace 222 adjacent corner 250. Likewise, beam member 274 may be pivotably connected to second support brace 222 adjacent corner 254. Beam member 276 may be disposed between beam members 270 and 272 and may extend from tip 280 towards second support brace 222. Beam member 278 may be disposed generally perpendicular to beam member 276 and generally parallel to beam member 236 of second support brace 222. An end of beam member 276 disposed opposite tip 280 may be connected to beam member 278. Although a particular truss configuration is described above for second connector brace 224, it is contemplated that second connector brace 224 may have other types of truss configurations.

Beam members 240 and 242 of second support brace 222 may include mounting holes (not shown) adjacent second end 228. Mounting holes 190 on rail ends 76 of left side rail 210 and right side rail 212 may be axially and circumferentially aligned with the mounting holes in beam members 240 and 242, respectively, of second support brace 222. Pip-pins 100 may be insertable through mounting holes 190 and the mounting holes in beam members 240 and 242 to pivotably and detachably attach second support brace 222 to second staircase section 202.

Second stair module 24 may also include left handrail 38 and right handrail 40. Left handrail 38 and right handrail 40 may each include link members 150, 152, and 154, which may be arranged and attached to second staircase section 202 in a manner similar to that described above with respect to left handrail 34 and first staircase section 58.

Figure 9:
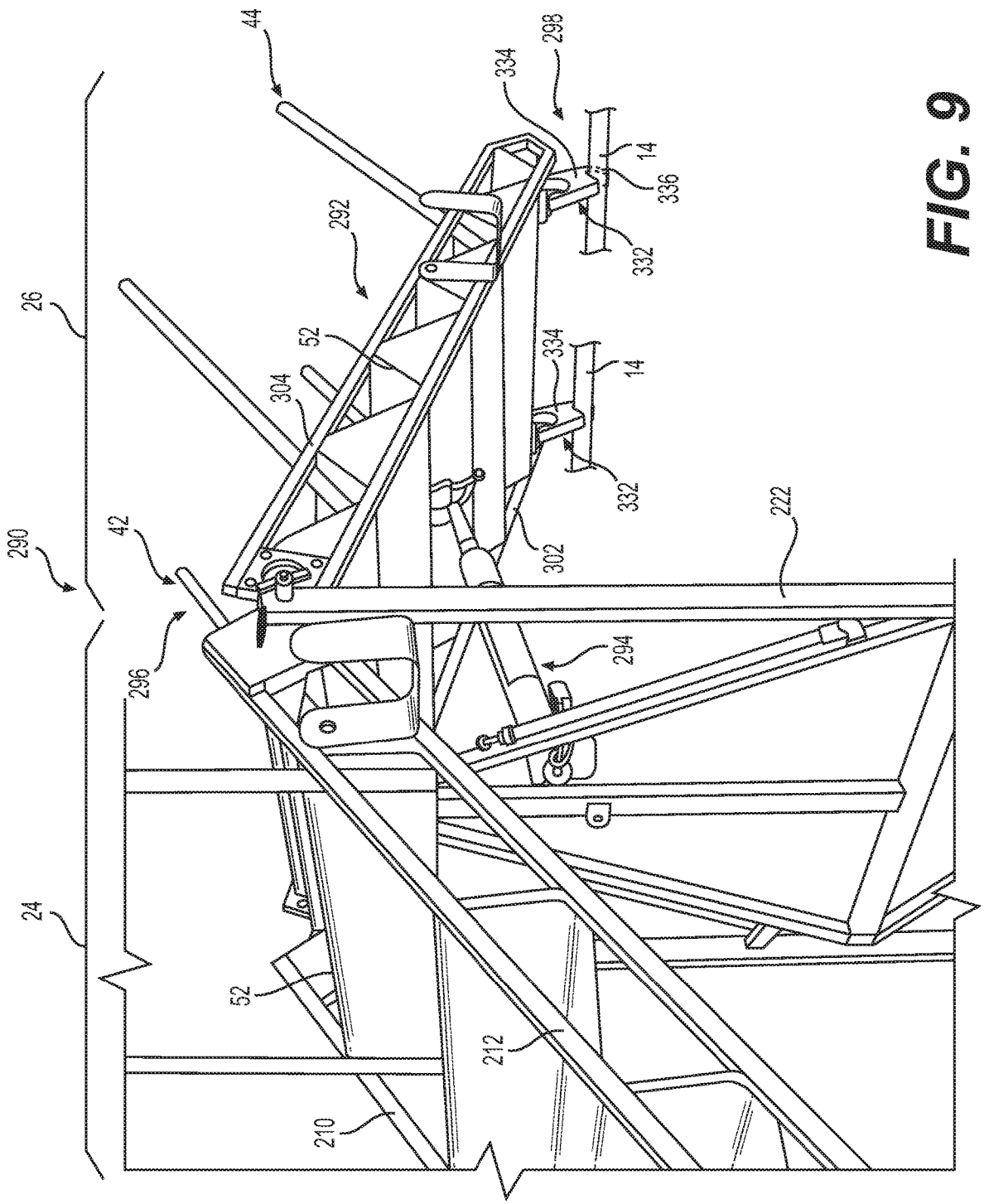
FIG. 9 is a perspective view of another exemplary stair assembly including two stair modules.

FIG. 9 illustrates a perspective view of an exemplary stair assembly 290. Stair assembly 290 may constitute a portion of modular staircase 10 and may include second stair module 24 and third stair module 26. Second stair module 24 of stair assembly 290 may have a structural arrangement and function similar to that described above with respect to FIG. 7.

Third stair module 26 may include third staircase section 292 and retractable third support member 294. Third staircase section 292 may extend from third proximal end 296 to third distal end 298. Third staircase section 292 may also include one or more steps 52, progressing from third proximal end 296 to third distal end 298. Third stair module 26 may include left side rail 302 and right side rail 304 disposed opposite to and spaced apart from left side rail 302. Both left and right side rails 302 and 304 may extend from adjacent third proximal end 296 to adjacent third distal end 298. Third staircase section 292 may extend from left side rail 302 to right side rail 304. In one exemplary embodiment as illustrated in FIG. 9, third staircase section 292 may be attached to left side rail 302 and right side rail 304. Steps 52 of third staircase section 292 may have a structure similar to that of steps 52 of first staircase section 58 described above.

Left side rail 302 and right side rail 304 may be equipped with brackets 214 adjacent third proximal end 296. Hooks 218 of brackets 214 of left side rail 302 and right side rail 304 may engage with mounting bars 188 of left and right side rails 210 and 212, respectively, adjacent second distal end 208 and third proximal end 296. Hooks 218 may help ensure that third staircase section 292 of third stair module 26 may be detachably connected to second stair module 24 adjacent third proximal end 296. Hooks 218 may also help ensure that third staircase section 292 of third stair module 26 may be attachable to second stair module 24 without the need for tools.

Figure 10:
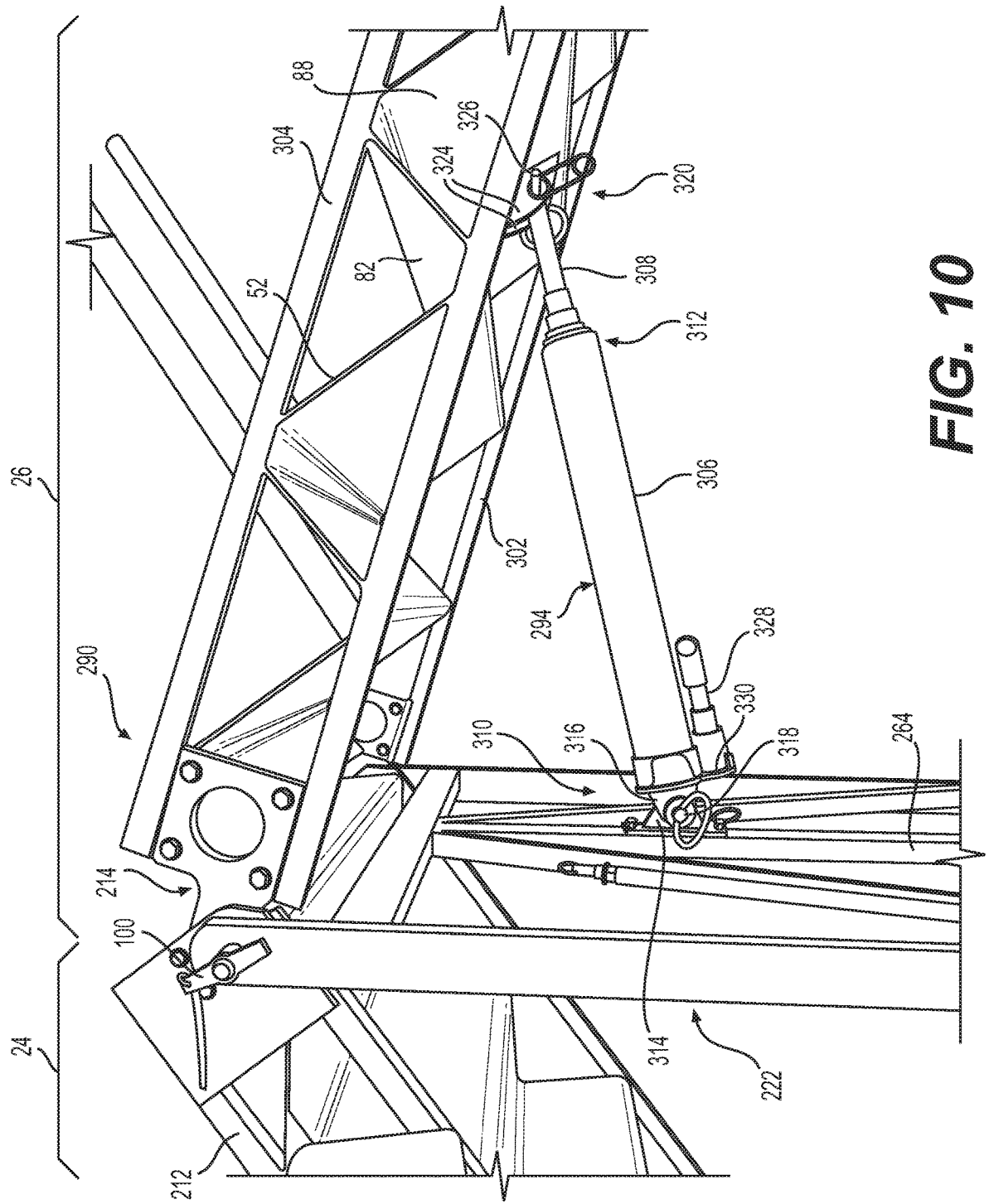
FIG. 10 is another perspective view of the exemplary disclosed stair assembly of FIG. 9.

Third support member 294 of third stair module 26 may be an actuator 294 configured to raise or lower third distal end 298 relative to the third proximal end 296 by increasing or decreasing a length of actuator 294. Actuator 294 may be a pneumatic or hydraulic actuator, or may be a mechanical actuator similar to a jack. As illustrated in FIG. 10, actuator 294 may include cylinder 306 and piston 308, which may be configured to slidingly move within cylinder 306. Cylinder 306 may extend from cylinder proximal end 310 to cylinder distal end 312. Cylinder proximal end 310 may be disposed adjacent second support brace 222 of second stair module 24. Cylinder distal end 312 may be disposed between cylinder proximal end 310 and third stair module 26. Cylinder proximal end 310 may be detachably connected to second support brace 222. In one exemplary embodiment as illustrated in FIG. 10, beam member 266 of second support brace 222 may include bracket 314. Cylinder 306 may also include bracket 316 disposed at cylinder proximal end 310. Brackets 314 and 316 may include openings (not shown), which may be configured to receive pin 318. Inserting pin 318 through the openings in both bracket 314 and bracket 316 may help attach actuator 294 pivotably to second support brace 222.

Piston 308 may be received in a recess within cylinder 306. Free end 320 of piston 308 may be pivotably connected to third stair module 26. One of plates 82 or 88 of steps 52 in third staircase section 292 may include bracket 322. In one exemplary embodiment as illustrated in FIG. 10, bracket 322 may include projections 324, which may be attached to plate 82 or plate 88 of steps 52. Projections 324 may be separated from each other to form a gap (not shown) configured to receive free end 320 of piston 308. Each of projections 324 may include an opening (not shown). Free end 320 of piston 308 may also include an opening (not shown). Pin 326 may pass through the openings in projections 324 and in free end 320 to pivotably and detachably attach piston 308 to third staircase section 292 of third stair module 26. It is contemplated that in some exemplary embodiments, actuator 294 may be detachably and pivotally attached to second support brace 222 of second stair module and third staircase section 292 of third stair module via fasteners, hooks, clamps or any other type of quick disconnect couplers.

Actuator 294 may include rocker arm 328, which may be configured to move reciprocatingly about rocker arm base 330 disposed adjacent cylinder proximal end 310. Reciprocatingly moving rocker arm 328 may generate an increased hydraulic pressure within cylinder 306, which in turn may drive piston 308 outward from cylinder 306 of actuator 294. Movement of piston 308 out of cylinder 306 may increase a length of piston 308, which may in turn raise a level of third distal end 298 above a level of third proximal end 296. Actuator 294 may include a valve (not shown) which may allow pressure within cylinder 306 to be released, which in turn may allow piston 308 to be retracted into cylinder 306. Retraction of piston 308 may cause a level of third distal end 298 to be reduced. It is contemplated that in some exemplary embodiments, actuator 294 may be a pneumatic actuator. When actuator 294 is pneumatic, compressed air may be supplied to actuator 294 to cause piston 308 to be driven outward from cylinder 306. Or the pneumatic actuator can be one that is hand pumped by the personnel using the staircase. Further, when actuator 294 is pneumatic, the release valve may allow air from cylinder 306 to be released to the atmosphere, thereby reducing a pressure of air in cylinder 306, which in turn may allow piston 308 to be retracted. The actuator can take a variety of forms known to the art and can also include mechanical or electromechanical actuators that can extend and retract as needed to move the distal end of a staircase section up and down, as needed.

Returning to FIG. 9, third stair module 26 may include one or more brackets 332 attached to third staircase section 292 adjacent third distal end 298. In one exemplary embodiment as illustrated in FIG. 9, bracket 332 may include bracket body 334 and hook 336. Bracket body 334 may be attached to third staircase section 292 of third stair module 26. In one exemplary embodiment, bracket body 334 may be fixedly attached to third staircase section 292 via riveted, welded, or brazed joints. In another exemplary embodiment, bracket body 334 may be detachably attached to third staircase section 292 via fasteners, and/or clamps. Bracket body 334 may project outwards from third staircase section 292. Hook 336 may also project outwards from bracket body 334. Hook 336 may be configured to engage with one or more mounting bars 14 affixed to elevated structure 12 (see also FIG. 1).

Third stair module 26 may include left handrail 42 and right handrail 44 only portions of which are illustrated in FIG. 9. Left handrail 42 and right handrail 44 may each include link members 150, 152, and 154, which may be arranged and attached to third staircase section 292 in a manner similar to that described above with respect to left handrail 34 and first staircase section 58.

Referring again to FIG. 1, first stair module 22, second stair module 24, and third stair module 26 may be assembled to provide modular staircase 10. It is contemplated, however, that any two of first stair module 22, second stair module 24, and third stair module 26 may be attached to each other to form many different embodiments of modular staircases. Thus, for example, first stair module 22 when used alone, as illustrated in FIG. 2, may constitute a modular staircase. Similarly, stair assembly 200 (see FIG. 8), including first stair module 22 and second stair module 24 may constitute a modular staircase.

Figure 11:
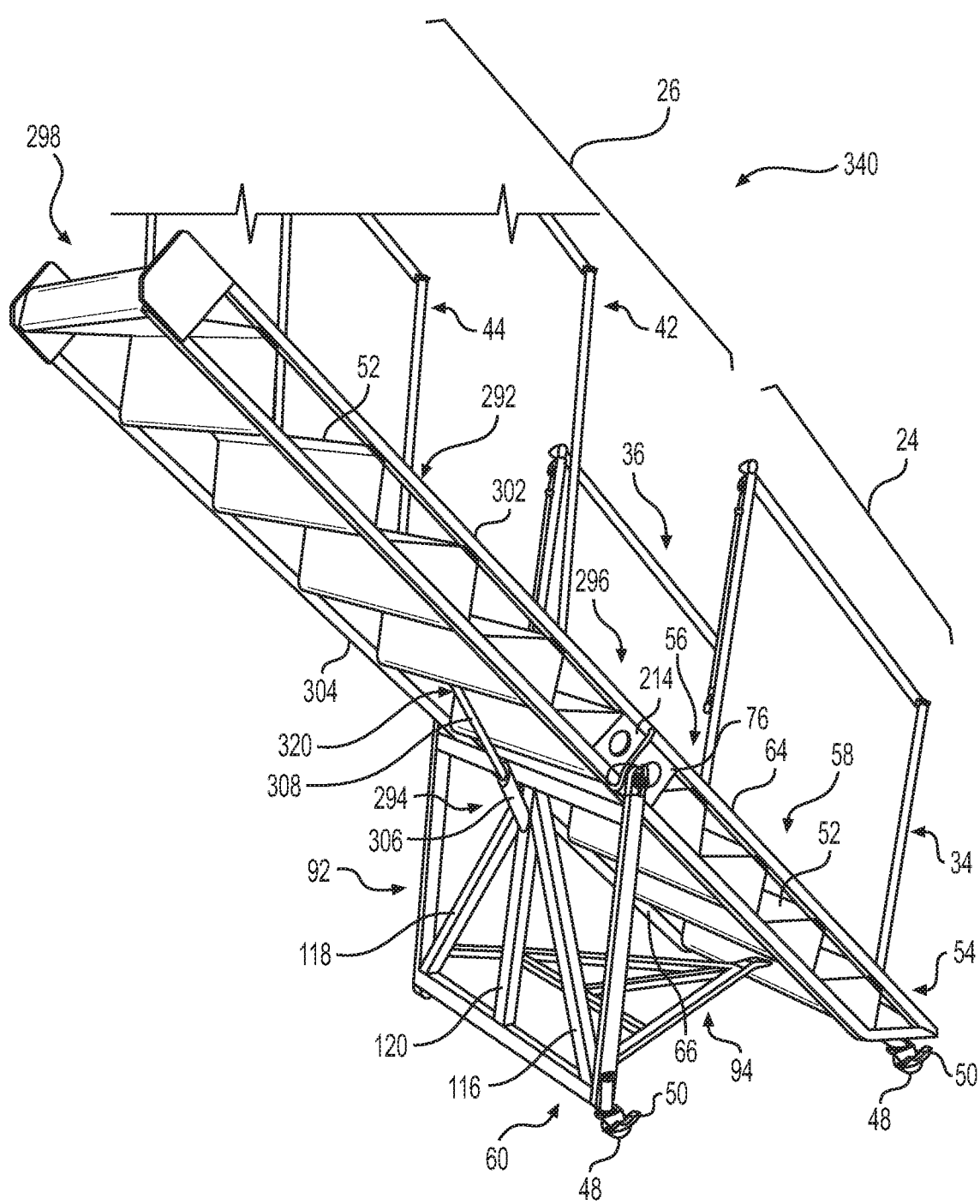
FIG. 11 is a perspective view of an exemplary modular staircase having two stair modules.

FIG. 11 illustrates another exemplary embodiment of modular stair case 340, including first stair module 22 and third stair module 24. As illustrated in FIG. 11, first stair module 22 may include steps 52 progressing from adjacent first proximal end 54 to adjacent first distal end 56. First stair module 22 may include left side rail 64 and right side rail 66, both of which may include rail ends 76 adjacent first distal end 56. Rail ends 76 of left side rail 64 and right side rail 66 may include mounting bars 188.

As also illustrated in FIG. 11, third stair module 26 may include steps 52 progressing from adjacent third proximal end 296 to third distal end 298. Third proximal end 296 may be disposed adjacent first distal end 56. Third stair module 26 may include left side rail 302 and right side rail 304 both of which may include a bracket 214 disposed adjacent third proximal end 296. Hook 218 of bracket 214 mounted on left side rail 302 may pivotingly engage with mounting bar 188 of rail end 76 of left side rail 64. Similarly, hook 218 of bracket 214 on right side rail 304 may pivotingly engage with mounting bar 188 of rail end 76 of right side rail 66.

In the exemplary embodiment of FIG. 11, cylinder 306 of actuator 294 may be detachably connected to first support member 60. For example, as illustrated in FIG. 11, cylinder 306 of actuator 294 may be connected to beam member 120. Free end 320 of piston 308 of actuator 294 may be connected to third staircase section 292. Actuator 294 may be configured to raise third distal end 298 of third stair module to a level higher than a level of third proximal end 296. Thus, first stair module 22 when assembled with third stair module 26 may constitute an exemplary modular staircase 340.

Lengths of actuator 294, and of the first and second support members 60 and 204 may be selected such that the lengths are smaller than a length of any one of first, second, and third staircase sections 58, 202, and 292, when the first and second support members 60 and 204 are folded. By selecting the lengths in this manner, the first, second, and third staircase sections 58, 202, and 292, first and second support members 60 and 204, and actuator 294 can be stowed in a volume having a length about equal to a length of a longest one of first, second, and third staircase sections 58, 202, and 292. This configuration may allow modular staircase 10 to be stored in a disassembled state in a very small volume within a cargo hold of aircraft 12. Further, modular staircase 10, including first, second, and third staircase sections 58, 202, and 292, first and second support members 60 and 204, and handrails 32, 34, 36, 38, 40, and 44 may be made of relatively light weight materials, for example, aluminum or a reinforced fiber composite material. Use of such light-weight materials may allow for assembly of modular staircase 10 without the need for equipment for lifting and/or positioning the various components of modular staircase 10 during assembly.

Figure 12:
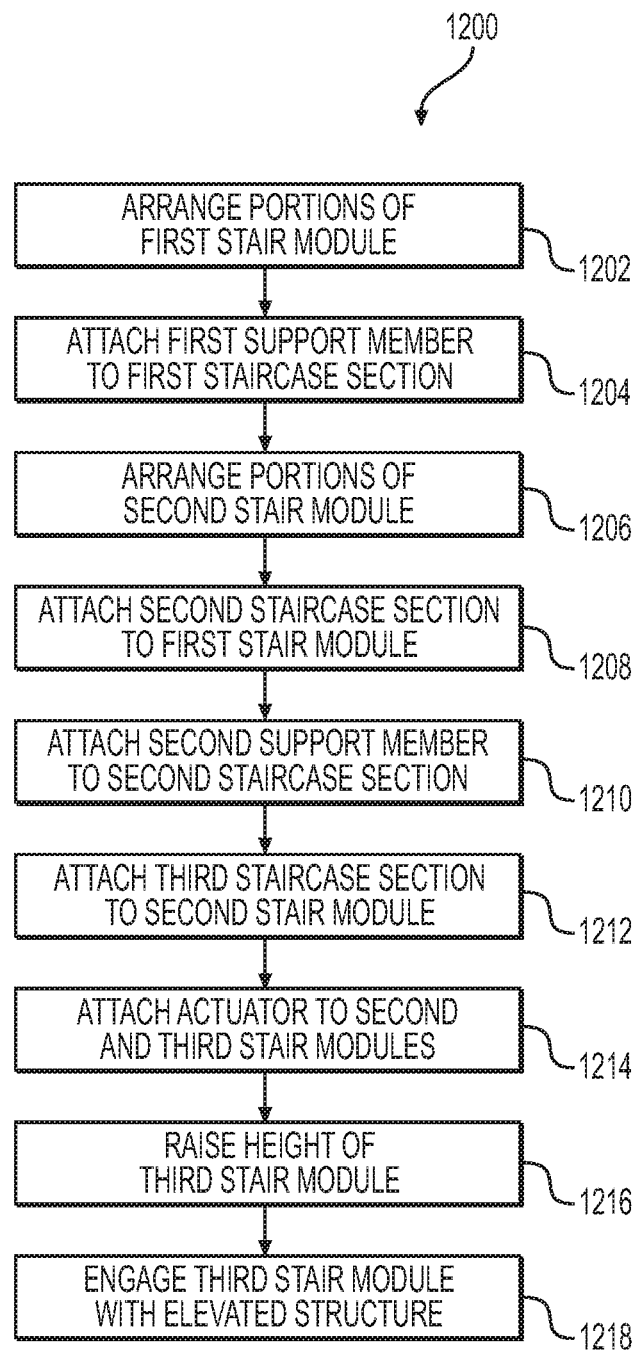
FIG. 12 is a flow chart illustrating an exemplary method of assembly for the modular staircase of FIG. 1.

FIG. 12 illustrates an exemplary method 1200 of assembly of modular staircase 10. The order and arrangement of steps in method 1200 is provided for purposes of illustration. As will be appreciated from this disclosure, modifications may be made to method 1200 by, for example, adding, combining, removing, and/or rearranging the steps of method 1200.

Figure 13:
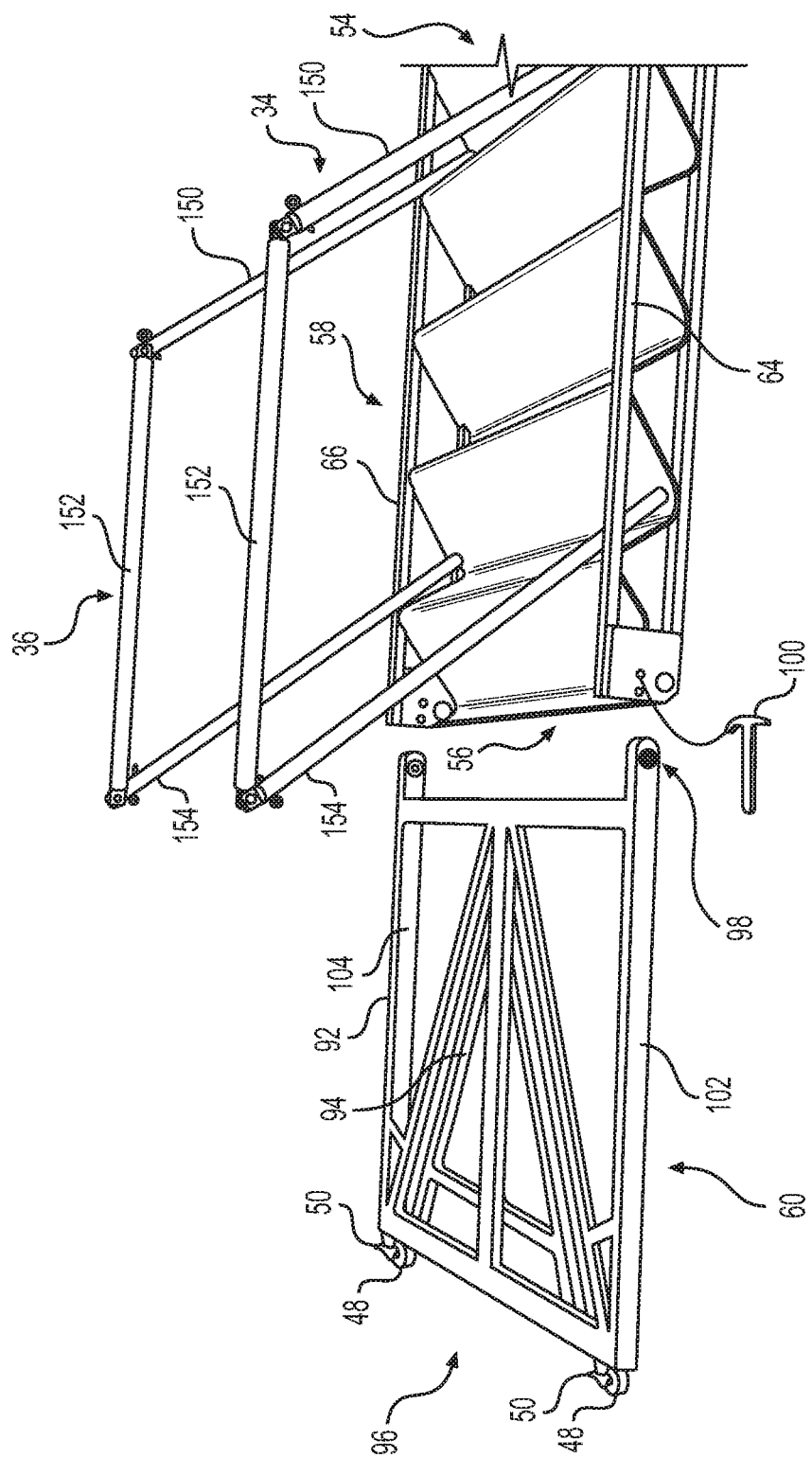
FIG. 13 is a perspective view illustrating an arrangement of portions of a stair module for assembly using the method of FIG. 12.

Method 1200 may include a step of arranging portions of first stair module 22 for assembly (Step 1202). Arranging the portions may include positioning first staircase section 58 and first support member 60 adjacent to each other. FIG. 13 illustrates this exemplary configuration. As illustrated in FIG. 13, first support member 60 may be positioned so that first support brace 92 is on top with first connector brace 94 folded beneath first support brace 92. Further, first support member 60 may be positioned adjacent first staircase section 58 such that second end 98 of first support brace 92 may be disposed adjacent first distal end 56 of first staircase section 58.

Method 1200 may include a step of attaching first support member 60 to first staircase section 58 (Step 1204). Attaching first support member 60 may include attaching first support brace 92 to first staircase section 58. Mounting holes in beam members 102 and 104 of first support brace 92 may be aligned with mounting holes 190 in rail ends 76 of left side rail 64 and right side rail 66, respectively, of first staircase section 58. Pip-pin 100 may be inserted through the opening in beam member 102 and mounting hole 190 in left side rail 64 to pivotably attach beam member 102 to first staircase section 58. Similarly pip-pin 100 may be inserted through the opening in beam member 104 and mounting hole 190 in right side rail 66 to pivotably attach beam member 104 to first staircase section 58.

Attaching first support member 60 to first staircase section 58 may further include attaching first connector brace to first staircase section 58. In one exemplary embodiment, this may include raising a level (i.e. height) of first distal end 56 above a level of first proximal end 54. This may be accomplished, for example, by lifting first distal end 56 of first staircase section 58 while maintaining first proximal end 54 on tarmac 16. As first distal end 56 is raised, first support brace 92 may pivot about pip pins 100 until wheels 48 rest on tarmac 16, such that second end 98 of first support brace 92 is raised to a level higher than a level of first end 96 of first support brace 92. First connector brace 94 may be pivoted about beam member 106 of first support brace 92 such that tip 148 may be disposed adjacent first proximal end 54 of first staircase section 58.

Attaching first support member 60 to first staircase section 58 may further include attaching tip 148 to first staircase section 58 adjacent first proximal end 54 of first stair module 22. To attach tip 148, tang 164 attached to first staircase section 58 may be inserted into gap 172 of clevis 162. Clevis pin 166 may be inserted through openings in projections 170 of clevis 162 and through an opening in tang 164. Attaching tip 148 to first staircase section 58 in this manner may complete assembly of first stair module 22 as illustrated in FIG. 2.

Figure 14:
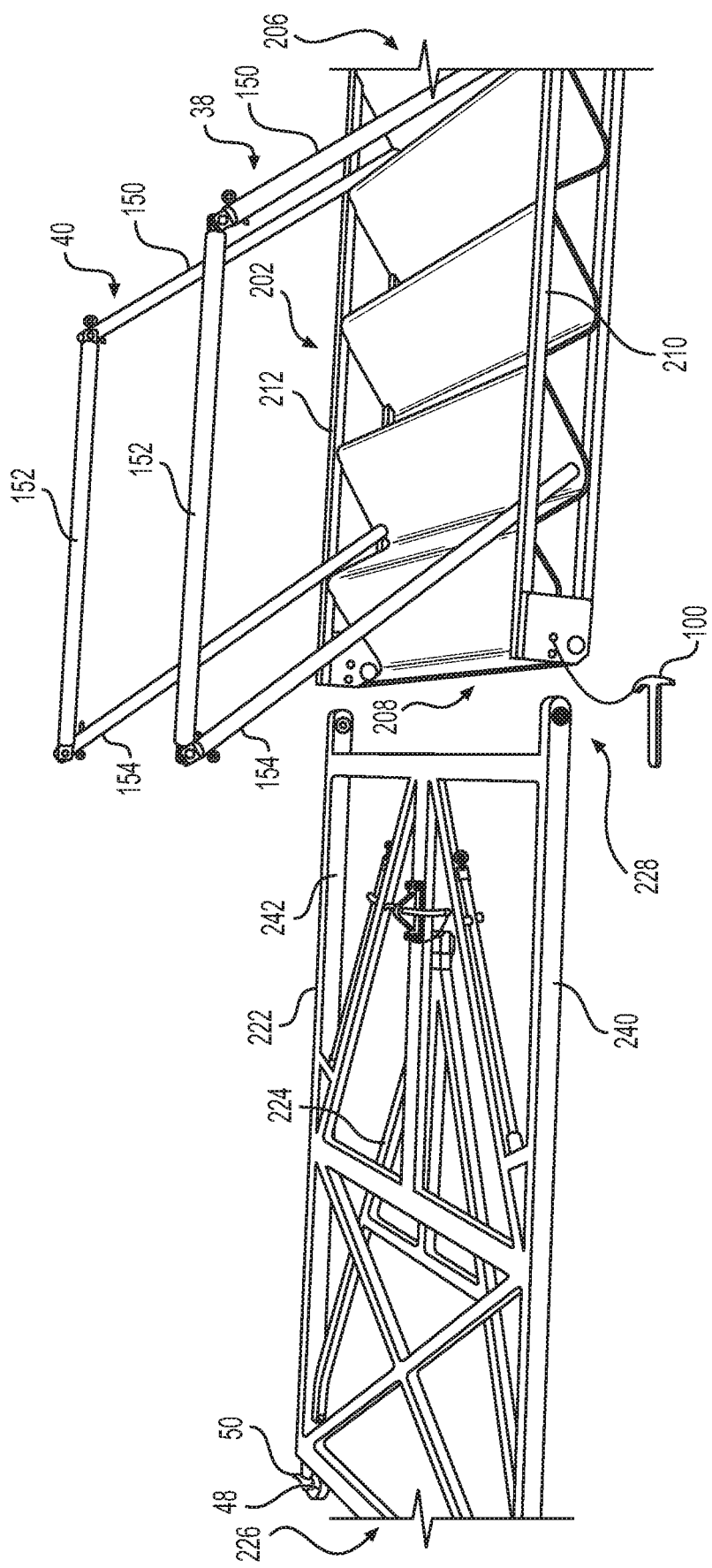
FIG. 14 is a perspective view illustrating an arrangement of portions of another stair module for assembly using the method of FIG. 12.

Method 1200 may include a step of arranging portions of second stair module 24 for assembly (Step 1206). Arranging the portions may include positioning second staircase section 202 and second support member 204 adjacent to each other. FIG. 14 illustrates this exemplary configuration. As illustrated in FIG. 14, second support member 204 may be positioned so that second support brace 222 is on top with second connector brace 224 folded beneath second support brace 222. Further, second support member 204 may be positioned adjacent second staircase section 202 such that second end 228 of second support brace 222 may be disposed adjacent second distal end 208 of second staircase section 202.

Figure 15:
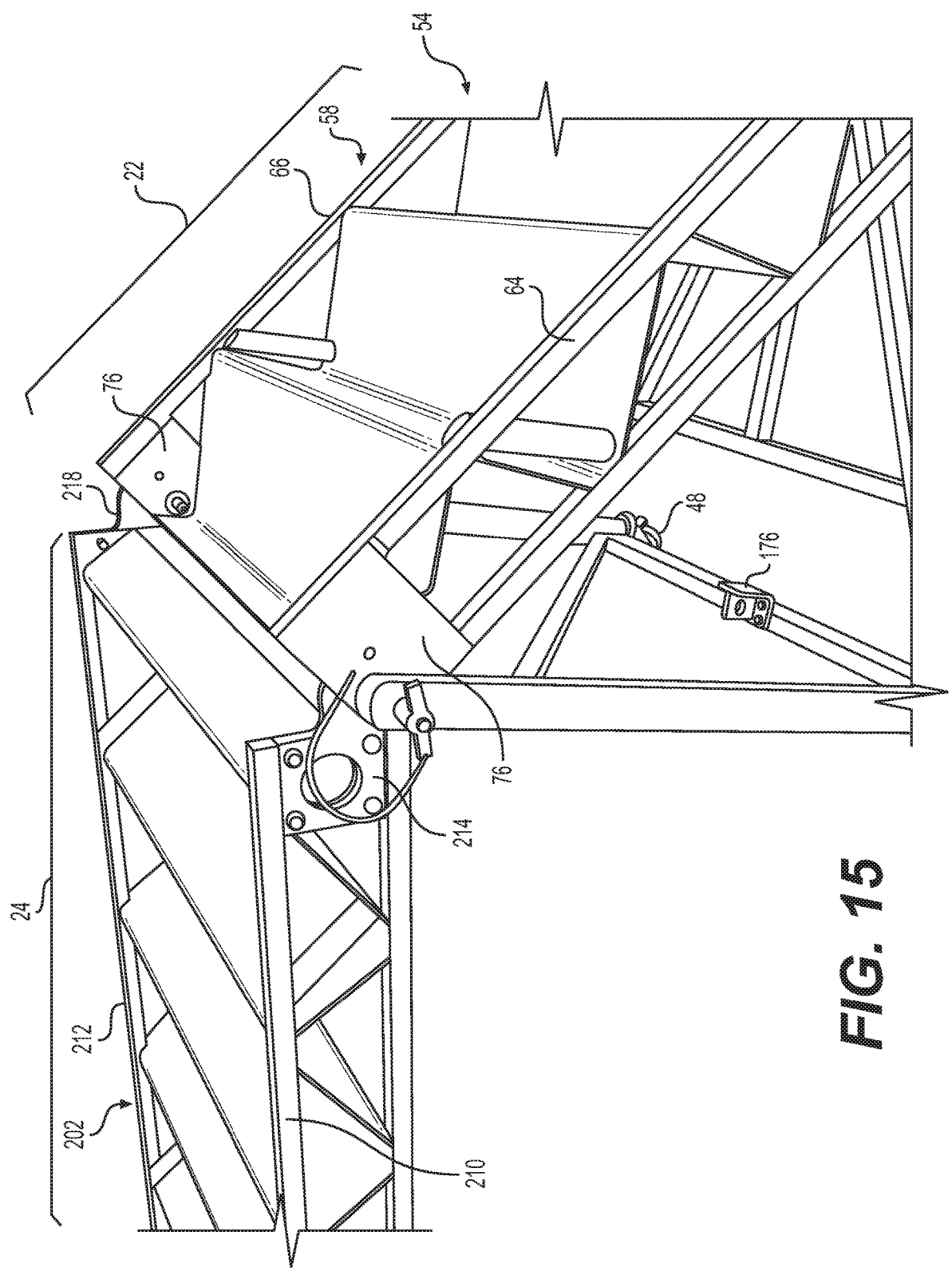
FIG. 15 is a perspective view illustrating assembly of a stair section to an already assembled stair module of the modular staircase of FIG. 1.

Method 1200 may include a step of attaching second staircase section 202 to first stair module 22 (Step 1208). As illustrated in FIG. 15, attaching second staircase section 202 may include raising second proximal end 206 of second staircase section 202 to a level about equal to a level of first distal end 56 of first stair module 22. This may be accomplished, for example, by lifting second proximal end 206 of second staircase section 202 while maintaining first proximal end 54 on tarmac 16. Attaching second staircase section 202 may further include inserting hooks 218 of brackets 214 on left side rail 210 and right side rail 212 into gaps 184 of rail ends 76 of left side rail 64 and right side rail 66, respectively. Attaching second staircase section 202 may further include engaging hooks 218 of brackets 214 on left side rail 210 and right side rail 212 with mounting bars 188 in rail ends 76 of left side rail 64 and right side rail 66, respectively.

Method 1200 may include a step of attaching second support member 204 to second staircase section 202 (Step 1210). Attaching second support member 204 may include attaching second support brace 222 to second staircase section 202. Mounting holes in beam members 240 and 242 of second support brace 222 may be aligned with mounting holes 190 in rail ends 76 of left side rail 210 and right side rail 212, respectively, of second staircase section 202. Pippin 100 may be inserted through the opening in beam member 240 and mounting hole 190 in left side rail 210 to pivotably attach beam member 240 to second staircase section 202. Similarly pip-pin 100 may be inserted through the opening in beam member 242 and mounting hole 190 in right side rail 212 to pivotably attach beam member 242 to second staircase section 202.

Attaching second support member 204 to second staircase section 202 may further include attaching second connector brace 224 to second staircase section 202. In one exemplary embodiment, this may include raising a level (i.e. height) of second distal end 208 above a level of second proximal end 206. This may be accomplished, for example, by lifting second distal end 208 of second staircase section 202. Raising second distal end 208 may also help ensure that hooks 218 of brackets 214 on left side rail 210 and right side rail 212 may fully engage with mounting bars 188 in rail ends 76 of left side rail 64 and right side rail 66, respectively. As second distal end 208 is raised, second support brace 222 may pivot about pip pins 100 until wheels 48 of second support brace 222 rest on tarmac 16, such that second end 228 of second support brace 222 is raised to a level higher than a level of first end 226 of second support brace 222. Second connector brace 224 may be pivoted about beam member 236 of second support brace 222 such that tip 280 may be disposed adjacent first end 96 of first support brace 92 of first stair module 22.

Attaching second support member 204 to second staircase section 202 may further include attaching tip 280 to first support brace 92 of first support member 60 adjacent first end 96. To attach tip 280, tang 164 attached to first support brace 92 may be inserted into gap 172 of clevis 162 attached to tip 280. Clevis pin 166 may be inserted through openings in projections 170 of clevis 162 and through an opening in tang 164. Attaching tip 280 to first staircase section 58 in this manner may complete stair assembly 200 as illustrated in FIG. 7.

Method 1200 may include a step of attaching third staircase section 292 of third stair module 26 to second stair module 24 (step 1212). Attaching third staircase section 292 may include raising third proximal end 296 of third staircase section 292 to a level about equal to a level of second distal end 208 of second stair module 24. This may be accomplished, for example, by lifting third proximal end 296 of third staircase section 292. Attaching third staircase section 292 may further include inserting hooks 218 of brackets 214 on left side rail 302 and right side rail 304 into gaps 184 of rail ends 76 of left side rail 210 and right side rail 212, respectively. Attaching third staircase section 292 may further include engaging hooks 218 of brackets 214 on left side rail 302 and right side rail 304 with mounting bars 188 in rail ends 76 of left side rail 210 and right side rail 212, respectively.

Method 1200 may include a step of attaching actuator 294 to second stair module 24 and third stair module 26 (Step 1214). Attaching actuator 294 may include aligning an opening in bracket 316 at cylinder proximal end 310 of actuator 294 with an opening in bracket 314 attached to beam member 264 of second support brace 222. A pin 318 may be inserted through the openings in brackets 314 and 316 to pivotably attach cylinder 306 of actuator 294 to second support brace 222. Attaching actuator 294 may also include raising third distal end 298 of third staircase section 292 so that free end 320 of piston 308 may be attached to third staircase section 292. To attach piston 308 to third staircase section 292, an opening in free end 320 of piston 308 may be aligned with an opening in projections 324 of bracket 322 attached to third staircase section 292. A pin 326 may be inserted through the openings in free end 320 and bracket 322 to attach free end 320 of piston 308 to third staircase section 292.

Method 1200 may include a step of raising a height of third stair module 26 (Step 1216). Raising a height of third stair module 26 may include reciprocatingly rocker arm 328, using, for example, a pry bar. Moving rocker arm 328 may generate hydraulic pressure within cylinder 306, which may drive piston 308 outwards from cylinder 306, raising a height of third distal end 298 of third stair module 267. Rocker arm 328 may be actuated until hook 336 reaches a level sufficient to engage with mounting bar 14 on elevated structure 12.

Method 1200 may include a step of engaging third stair module 26 with elevated structure 12 (Step 1218). Engaging third stair module 26 with elevated structure 12 may include opening a pressure release valve on actuator 294 to allow pressure in cylinder 306 to be reduced. Reduction of pressure in cylinder 306 may cause piston 308 to withdraw (i.e. retract) into cylinder 306. As piston 308 retracts, third distal end 298 may be lowered so the one or more hooks 336 attached to third staircase section 292 may engage with one or more mounting bars on elevated structure 12. Engaging hooks 336 in this manner with elevated structure 12 may allow a weight of third staircase section 292 to be supported by second stair module 24 and elevated structure 12. Engaging hooks 336 in this manner with elevated structure 12 may also complete assembly of modular staircase 10, as illustrated in FIG. 1.

As evident from the above description, first, second, and third stair modules 22, 24, and 26 may be assembled to each other to form modular stair case 10 without the need for tools. In particular, rail ends 86, pip-pins 100, brackets 214, quick disconnect connectors 160, brackets 314 and 316, pins 318 and 326, and brackets 330 may help ensure that first, second, and third stair modules 22, 24, and 26 may be assembled to each other without the use of tools. Further, because first support member 60, second support member 204, and actuator 294 are detachable from first, second, and third staircase sections 80, 202, and 292, respectively, and because first and second support members 60 and 204 are foldable, modular staircase 10 in its disassembled form can be stored in a limited amount of storage space in a cargo hold of aircraft 12. Thus, modular staircase 10 may be stored in its disassembled form on aircraft 12, allowing modular staircase to be assembled for use even at airfields that may not be equipped with manual or motorized staircases for use with aircraft.

The various modular staircases disclosed herein can be designed such that the staircase, when disassembled, can occupy as little space as possible in the aircraft, to allow the majority of the cargo hold to be used for storing supplies and equipment. The modular elements of the staircases can be designed to have approximately equal lengths, so that the various components can be stowed in a compact manner. The disclosed modular staircases are relatively light and also allow for quick and simple assembly by the personnel using the modular staircase, without the need for tools or heavy lifting equipment.

The modular staircases of the present invention in the simplest form can include one modular unit that can be disassembled to a relatively flat combination of a staircase section and related support assembly, with the support assembly preferably being foldable and easily attachable to and detachable from the staircase section. The modular staircases of the present invention can include two stair modules, each having a foldable support assembly. The modular staircase can also include two or three stair modules, with one retractable support member in the form of an actuator to raise a distal end of a stair module, so that the distal end can be extended and connected to a support member of a structure to which the upper end of the modular staircase can be attached. Further, the present disclosure contemplates modular staircases of three or more stair modules, using in combination the disclosed features of the modular components and resulting in an easily assembled and disassembled modular staircase that can be compactly stored and transferred and that is relatively lightweight and inexpensive.

It will be apparent to those skilled in the art that various modifications and variations can be made to the disclosed modular staircases. Other embodiments will be apparent to those skilled in the art from consideration of the specification and practice of the disclosed modular staircases. It is intended that the specification and examples be considered as exemplary only, with a true scope being indicated by the following claims and their equivalents.

What is claimed is:

1. A modular staircase, comprising:
    a first stair module including:
        a first staircase section having a first plurality of steps progressing from a first proximal end to a first distal end; and
        a foldable first support member connectable to the first distal end, the first support member configured to position the first distal end at a first level higher than the first proximal end, wherein the foldable first support member includes:
            a first support brace connectable to the first distal end of the first staircase section; and
            a first connector brace pivotably connected to the first support brace and detachably connected to the first staircase section at a location closer to the first proximal end than the first distal end;
    a second stair module including:
        a second staircase section having a second plurality of steps progressing from a second proximal end to a second distal end, the second staircase section being connectable to and detachable from the first stair module at the second proximal end; and
        a foldable second support member connectable to the second distal end, the second support member configured to position the second distal end at a second level higher than the second proximal end, wherein the foldable second support member includes:
a second support brace connectable to the second distal end of the second staircase section;
a second connector brace pivotably connected to the second support brace and detachably connected to the first support brace; and
one or more wheels enabling ground movement of the second stair module;
wherein:
the first staircase section includes at least one mounting bar disposed adjacent the first distal end, and
the second stair module includes at least one fastener configured to be engaged with the at least one mounting bar.

2. The modular staircase of claim 1, wherein the at least one fastener includes at least one hook.

3. The modular staircase of claim 2, wherein the at least one hook is pivotably engaged with the at least one mounting bar.

4. The modular staircase of claim 1, wherein the foldable first support member includes:
one or more wheels enabling ground movement of the first stair module.

5. The modular staircase of claim 1, wherein the second support brace is disposed generally perpendicular to the second connector brace.

6. The modular staircase of claim 1, further including a third stair module connectable to the second stair module, the third stair module including:
a third staircase section having a third plurality of steps progressing from a third proximal end to a third distal end; and
a retractable third support member extending between the second support member and the third staircase section and configured to raise or lower the third distal end relative to the second distal end.

7. The modular staircase section of claim 6, wherein the third proximal end is configured to be connected to the second distal end.

8. The modular staircase of claim 7, wherein the third support member includes an actuator connected at one end to the second support member and connected at an opposite end to the third staircase section.

9. The modular staircase of claim 8, wherein the actuator is configured to raise or lower the third distal end by respectively increasing or decreasing a length of the actuator.

10. The modular staircase of claim 6, wherein
the second staircase section includes a second mounting bar disposed adjacent the second distal end, and
the third staircase section includes a fastener disposed adjacent the third proximal end, the fastener pivotably engaged with the second mounting bar.

11. A modular staircase, comprising:
a first stair module including:
a first staircase section having a first plurality of steps progressing from a first proximal end to a first distal end; and
a foldable first support member connectable to the first distal end, the first support member configured to position the first distal end at a first level higher than the first proximal end, wherein the foldable first support member includes:
a first support brace connectable to the first distal end of the first staircase section; and
a first connector brace pivotably connected to the first support brace and detachably connected to the first staircase section at a location closer to the first proximal end than the first distal end;
a second stair module including:
a second staircase section having a second plurality of steps progressing from a second proximal end to a second distal end, the second staircase section being connectable to and detachable from the first stair module at the second proximal end; and
a foldable second support member connectable to the second distal end, the second support member configured to position the second distal end at a second level higher than the second proximal end;
a third stair module including:
a third staircase section having a third plurality of steps progressing from a third proximal end to a third distal end, wherein the third proximal end is configured to be connected to the second distal end; and
a retractable third support member extending between the second support member and the third staircase section and configured to raise or lower the third distal end relative to the second distal end; wherein the third support member includes an actuator connected at one end to the second support member and connected at an opposite end to the third staircase section
wherein:
the first staircase section includes at least one mounting bar disposed adjacent the first distal end, and
the second stair module includes at least one fastener configured to be engaged with the at least one mounting bar.

* * * * *